United States Patent
Kuno

(10) Patent No.: US 8,184,917 B2
(45) Date of Patent: May 22, 2012

(54) IMAGE PROCESSOR

(75) Inventor: Masashi Kuno, Obu (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 232 days.

(21) Appl. No.: 12/729,409

(22) Filed: Mar. 23, 2010

(65) Prior Publication Data
US 2011/0033124 A1 Feb. 10, 2011

(30) Foreign Application Priority Data

Aug. 5, 2009  (JP) ................................. 2009-182183
Aug. 5, 2009  (JP) ................................. 2009-182185
Aug. 5, 2009  (JP) ................................. 2009-182196

(51) Int. Cl.
*G06K 9/36* (2006.01)
*H04N 1/40* (2006.01)

(52) U.S. Cl. ........................ 382/232; 382/274; 358/3.01

(58) Field of Classification Search ........... 382/100–322
See application file for complete search history.

(56) References Cited

U.S. PATENT DOCUMENTS

| | | | | |
|---|---|---|---|---|
| 4,680,720 A | * | 7/1987 | Yoshii et al. | 345/472 |
| 4,943,869 A | * | 7/1990 | Horikawa et al. | 382/251 |
| 5,355,421 A | * | 10/1994 | Koyama | 382/266 |
| 5,359,430 A | * | 10/1994 | Zhang | 358/3.13 |
| 5,729,625 A | * | 3/1998 | Miyake | 382/169 |
| 5,799,108 A | * | 8/1998 | Okahashi | 382/205 |
| 5,835,687 A | * | 11/1998 | Brown et al. | 358/1.9 |
| 6,091,858 A | | 7/2000 | Yoshida | |
| 6,195,468 B1 | * | 2/2001 | Yoshida | 382/270 |
| 6,519,366 B1 | * | 2/2003 | Kaburagi | 382/251 |
| 6,608,700 B1 | * | 8/2003 | Mantell | 358/1.9 |
| 6,678,073 B1 | * | 1/2004 | Jewitt | 358/3.04 |
| 6,870,643 B2 | * | 3/2005 | Thompson et al. | 358/3.05 |
| 7,110,128 B1 | * | 9/2006 | Kaburagi et al. | 358/1.15 |
| 7,221,483 B2 | * | 5/2007 | Yagishita et al. | 358/3.13 |
| 8,023,764 B2 | * | 9/2011 | Miyake et al. | 382/275 |
| 8,077,993 B2 | * | 12/2011 | Roberts | 382/252 |

(Continued)

FOREIGN PATENT DOCUMENTS

JP  5-344325 A  12/1993

(Continued)

*Primary Examiner* — Manav Seth
(74) *Attorney, Agent, or Firm* — Scully, Scott, Murphy & Presser, PC

(57) ABSTRACT

The image processor processes each pixel of a halftone image by sequentially setting each pixel as a target pixel. A converting unit converts a pixel density of the target pixel into a first output value. An error data calculation unit calculates error data of the target pixel. The error data corresponds to a difference between the first output value and the pixel density. A compression unit irreversibly compresses the error data of the target pixel. Partial data of the pixel density is lost from the error data when irreversibly compressing the error data. An error buffer stores the compressed error data of the target pixel and a plurality of sets of compressed error data for a plurality of processed pixels. A decompression unit reads and decompresses a plurality of sets of compressed error data for a plurality of peripheral pixels with respect to a next target pixel from the error buffer. A density correction unit corrects a pixel density of the next target pixel based on the decompressed error data sets for the plurality of peripheral pixels. The converting unit converts the corrected pixel density of the next target pixel into a second output value. A data compensating unit compensates the partial data.

18 Claims, 12 Drawing Sheets

U.S. PATENT DOCUMENTS

2003/0137478 A1   7/2003   Naganuma

FOREIGN PATENT DOCUMENTS

| | | |
|---|---|---|
| JP | 7-147542 A | 6/1995 |
| JP | 8-305328 A | 11/1996 |
| JP | 10-191052 A | 7/1998 |
| JP | 11-136510 A | 5/1999 |
| JP | 2001-343926 A | 12/2001 |

* cited by examiner

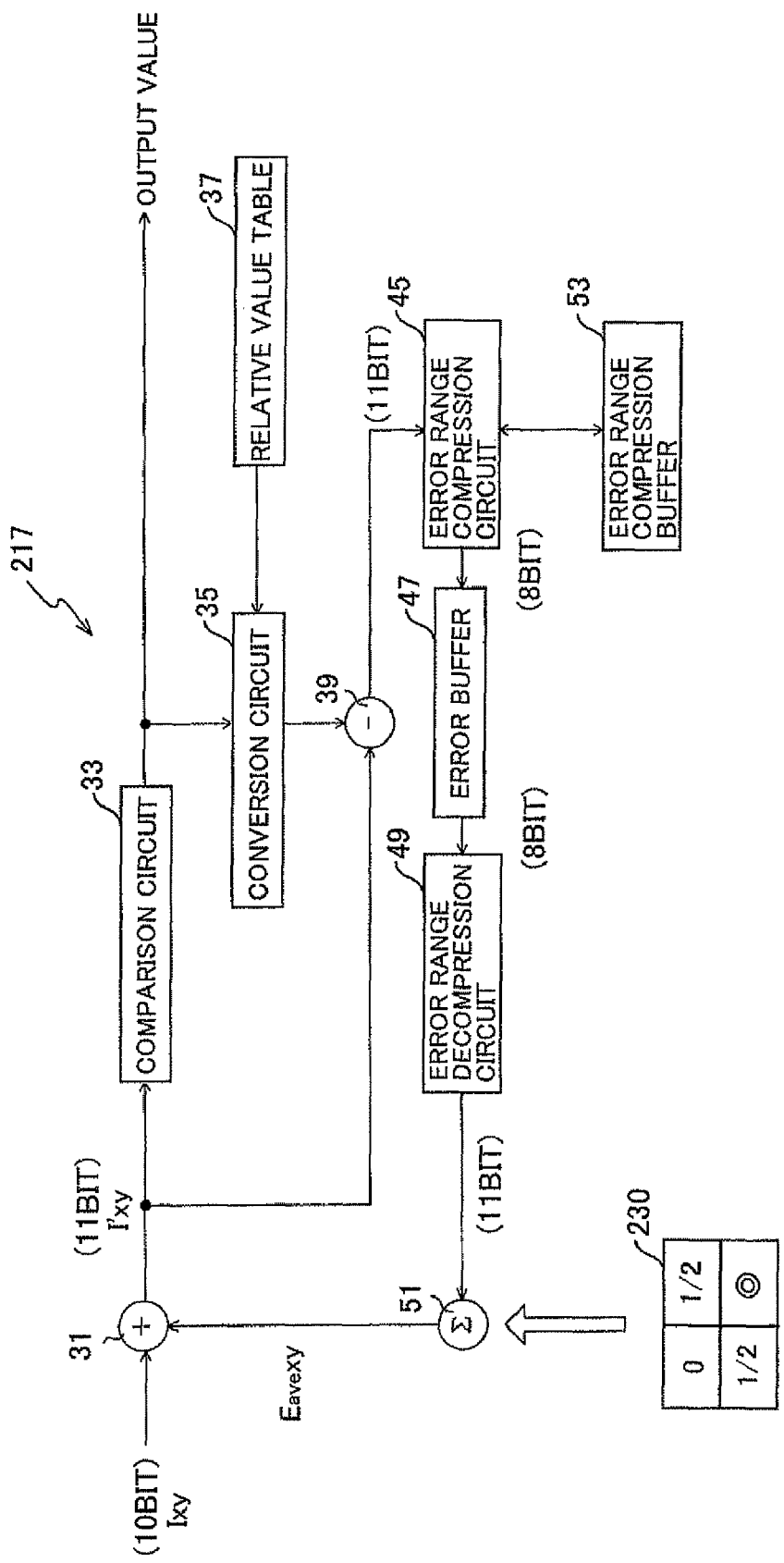

FIG.11A

OUTPUT VALUE

| 0 | 0 | 0 | 0 | 0 | 0 | 0 | 0 | 0 | 0 | 0 |
|---|---|---|---|---|---|---|---|---|---|---|
| 0 | 0 | 0 | 0 | 0 | 0 | 0 | 0 | 0 | 0 | 0 |

$P_k$

ERROR BUFFER 47

| 0 | 0 | 0 | 0 | 0 | 0 | 0 | 0 | 0 | 0 | 0 |
|---|---|---|---|---|---|---|---|---|---|---|
| 0 | 0 | 0 | 0 | 0 | 0 | 0 | 0 | 0 | 0 | 0 |

$47_k$

ERROR RANGE COMPRESSION BUFFER 53 | 0 |

FIG.11B

OUTPUT VALUE

| 0 | 0 | 0 | 0 | 0 | 0 | 0 | 0 | 0 | 0 | 0 |
|---|---|---|---|---|---|---|---|---|---|---|
| 0 | 0 | 0 | 0 | 0 | 0 | 0 | 0 | 0 | 0 | 0 |

$P_{k+1}$

ERROR BUFFER 47

| 0 | 0 | 0 | 0 | 0 | 0 | 0 | 0 | 0 | 0 | 0 |
|---|---|---|---|---|---|---|---|---|---|---|
| 0 | 0 | 0 | 0 | 0 | 0 | 0 | 0 | 0 | 0 | 0 |

$47_{k+1}$

ERROR RANGE COMPRESSION BUFFER 53 | 7 |

FIG.11C

OUTPUT VALUE

| 0 | 0 | 0 | 0 | 0 | 0 | 0 | 0 | 0 | 0 | 0 |
|---|---|---|---|---|---|---|---|---|---|---|
| 0 | 0 | 0 | 0 | 0 | 0 | 0 | 0 | 0 | 0 | 0 |

$P_{k+2}$

ERROR BUFFER 47

| 0 | 0 | 0 | 0 | 0 | 0 | 0 | 0 | 0 | 0 | 0 |
|---|---|---|---|---|---|---|---|---|---|---|
| 0 | 0 | 0 | 0 | 1 | 0 | 0 | 0 | 0 | 0 | 0 |

$47_{k+2}$

ERROR RANGE COMPRESSION BUFFER 53 | 6 |

FIG.11D

OUTPUT VALUE

| 0 | 0 | 0 | 0 | 0 | 0 | 0 | 0 | 0 | 0 | 0 |
|---|---|---|---|---|---|---|---|---|---|---|
| 0 | 0 | 0 | 0 | 1 | 0 | 0 | 0 | 0 | 0 | 0 |

$P_{k+3}$

ERROR BUFFER 47

| 0 | 0 | 0 | 0 | 0 | 0 | 0 | 0 | 0 | 0 | 0 |
|---|---|---|---|---|---|---|---|---|---|---|
| 0 | 0 | 0 | 1 | -125 | 0 | 0 | 0 | 0 | 0 | 0 |

$47_{k+2}$   $47_{k+3}$

ERROR RANGE COMPRESSION BUFFER 53 | -6 |

IMAGE PROCESSOR

CROSS REFERENCE TO RELATED APPLICATION

This application claims priority from Japanese Patent Application Nos. 2009-182183 filed Aug. 5, 2009, 2009-182185 filed Aug. 5, 2009, and 2009-182196 filed Aug. 5, 2009. The entire content of each of those priority applications is incorporated herein by reference.

TECHNICAL FIELD

The present invention relates to an image processor.

BACKGROUND

Many conventional image processors employ error diffusion as a technique for converting a halftone image to a binary (or bit-mapped) image. When performing image thresholding based on an error diffusion method, error generated during the process can be dispared to other pixels in subsequent thresholding processes. Specifically, each pixel in a single row of pixels arranged horizontally in a halftone image (hereinafter, a single row of pixels will be referred to as a "raster") is sequentially set as a target pixel, and the target pixel is set to either "dot output" or "no dot output" by comparing its density to a threshold value. The error produced for each pixel in the thresholding process is stored in an error buffer. The density of the next target pixel subjected to thresholding is corrected using the error stored in the error buffer (i.e., the error produced when processing the previous pixel) and the corrected pixel density is compared to the threshold value.

SUMMARY

FIG. 1A conceptually illustrates an example of a diffusion matrix (weighting matrix) 100. In FIG. 1A, the symbol "⊙" denotes the matrix element corresponding to the current target pixel, and the numbers in other elements of the matrix denote the weighting coefficients to be multiplied by error value associated with peripheral pixels of the target pixel. When using the diffusion matrix 100 shown in FIG. 1A, the pixel adjacent to the target pixel on the left and the pixel adjacent to the target pixel on the top correspond to peripheral pixels. The error value generated when these peripheral pixels were processed is read from the error buffer and passed on to the target pixel. In this example, the error buffer must be designed to store error values for pixels in at least two rasters.

If the density values for pixels in the halftone image fall within a range of values expressed by 10 bits of data (decimal values from 0 to 1023), for example, then the error value for each pixel is processed within a range of values expressed by 11 bits, for example, including a sign bit (i.e., the decimal values from −1024 to 1023). Since memory is normally managed in 8-bit units, 16 bits per pixel must be allocated in the error buffer in order to store an 11-bit error value for each pixel. Hence, the error buffer requires a capacity of (16 bits)×(number of pixels per raster)×(vertical dimension of the diffusion matrix).

The 11-bit error value for each pixel is stored in the error buffer after first compressing the value to an 8-bit value (a decimal value between −128 and 127), for example. The 11-bit error value is compressed by dividing the error value by "8", i.e., by right-shifting the error value 3 bits. This process reduces the amount of memory per pixel that must be allocated to 8 bits, thereby cutting memory usage in half.

When error values are stored in the error buffer in this compressed form, the image processor reading an error value from the error buffer must left-shift the error value 3 bits in order to restore (or decompress) the error value to the original 11-bit length. Thereafter, the image processor can multiply the error value by a corresponding weighting coefficient in the diffusion matrix and can add the result to the density of the target pixel.

However, there is room for improvement in this conventional method of compressing error values. FIGS. 1B through 1D illustrate a problem that occurs when compressing and decompressing error values according to the conventional technique described above. FIGS. 1B through 1D conceptually illustrate a single raster 102 in the halftone image. Each element of the raster 102 represents a pixel, and the number entered in each element represents either the pixel density or an output value for the corresponding pixel. Unless otherwise noted, all values in this specification and the accompanying drawings are expressed in decimal. Values in binary notation will be enclosed in parentheses followed by a subscript "2".

The following description with reference to FIGS. 1B through 1D will illustrate how density values for each pixel in the raster 102 are converted according to the conventional technique through thresholding using the diffusion matrix 100. In the following description, the threshold value will be "8", a relative value set for "dot output" is "1023", and the relative value set for "no dot output" is "0".

First, the leftmost pixel in the raster 102 is targeted for thresholding, as shown in FIG. 1B. Since this target pixel has no peripheral pixels, the density value "7" of the targeted pixel is simply compared to the threshold value "8". Since the density value "7" is less than the threshold "8", the density of this pixel is converted to the output value "0", indicating "no dot output." The error value for this pixel is calculated as "7" by subtracting the relative value "0" from the pixel density "7". In other words, the error value is found to be $(+0000000111)_2$. This error value is right-shifted 3 bits, i.e., compressed to an 8-bit value, and is stored in the error buffer. Thus, the error buffer holds the value $(+0000000)_2$ for this pixel.

FIG. 1C conceptually illustrates the error value passed on from the first pixel processed as the target pixel to the neighboring pixel on the right. In this example, the error value produced by the first processed pixel is read from the error buffer, restored to an 11-bit value, and passed on to the current target pixel.

However, when the error value $(+0000000)_2$ read from the error buffer for the first processed pixel is left-shifted 3 bits and restored to an 11-bit value, the restored value is now (+00000000000, as shown in FIG. 1C. Hence, even though the error value generated by the first target pixel was originally "7", the error value passed on to the next pixel is "0" because three bits of precision are lost through the process of compressing and decompressing the error value.

FIG. 1D conceptually illustrates the thresholding process performed on the second target pixel. As described with reference to FIG. 1C, an error value of "0" is passed on to the second target pixel. Accordingly, even though this error value is multiplied by the coefficient "½" indicated in the diffusion matrix 100 and added to the density value "7" of the second target pixel, the corrected density of the target pixel remains "7". Therefore, as with the first target pixel, the density value "7" of the second target pixel is converted to "0". Further, as with the first target pixel, the error value "7" generated by the thresholding process for the second target pixel becomes "0"

through compression and decompression. Thus, the error values produced by these pixels are not passed on to other pixels and, hence, not accumulated.

As illustrated above, the conventional technique always discards error with an absolute value of "7" or less, preventing pixels from being converted to "dot output," despite the density value of each pixel being greater than "0". This leads to the problem of "tone jump" at lower densities in an image, resulting in a deterioration of image quality. Here, "tone jump" refers to a phenomenon in which image levels vary in steps, skipping one or more tone values, rather than continuously, and can adversely affect image quality.

In view of the foregoing, it is an object of the present invention to provide an image processor capable of suppressing the occurrence of tone jump at low densities, without increasing memory usage.

In order to attain the above and other objects, there is provided an image processor for processing each pixel of a halftone image by sequentially setting each pixel as a target pixel. Each pixel is defined by a pixel density representing a gradation level of each pixel. The image processor includes a converting unit, an error data calculation unit, a compression unit, an error buffer, a decompression unit, a density correction unit, and a data compensating unit. The converting unit converts the pixel density of the target pixel into a first output value. The first output value indicates whether or not a dot is formed on the target pixel. The error data calculation unit calculates error data of the target pixel. The error data corresponds to a difference between the first output value and the pixel density. The compression unit irreversibly compresses the error data of the target pixel. Partial data of the pixel density is lost from the error data when irreversibly compressing the error data. The error buffer stores the compressed error data of the target pixel and a plurality of sets of compressed error data for a plurality of processed pixels. The plurality of processed pixels have been processed by the converting unit, the error data calculation unit, and the compression unit prior to the target pixel. The decompression unit reads a plurality of sets of compressed error data for a plurality of peripheral pixels with respect to a next target pixel from the error buffer and decompresses the compressed error data sets for the plurality of peripheral pixels. The next target pixel is processed next to the target pixel. The density correction unit corrects a pixel density of the next target pixel based on the decompressed error data sets for the plurality of peripheral pixels. The converting unit converts the corrected pixel density of the next target pixel into a second output value. The second output value indicates whether or not a dot is formed on the next target pixel. The data compensating unit compensates the partial data.

According to another aspect of the present invention, there is provided an image processor for processing each pixel of a halftone image by sequentially setting each pixel as a target pixel. Each pixel is defined by a pixel density representing a gradation level of each pixel. The image processor includes a converting unit, an error data calculation unit, a compression unit, an error buffer, a decompression unit, and a data compensating unit. The converting unit converts the pixel density of the target pixel into a first output value. The first output value indicates whether or not a dot is formed on the target pixel. The error data calculation unit calculates error data of the target pixel. The error data corresponds to a difference between the output value and the pixel density. The compression unit irreversibly compresses the error data of the target pixel. Partial data of the pixel density is lost from the error data when irreversibly compressing the error data. The error buffer stores the compressed error data of the target pixel. The decompression unit reads and decompresses the compressed error data of the target pixel that is stored in the error buffer. The data compensating unit that compensates the partial data.

BRIEF DESCRIPTION OF THE DRAWINGS

In the drawings:

FIG. 9 is a block diagram conceptually illustrating the structure of the error diffusion circuit according to a third embodiment;

FIGS. 11A and 11D conceptually illustrate effects of thresholding performed by the error diffusion circuit according to the third embodiment.

DETAILED DESCRIPTION

Figure 1A:
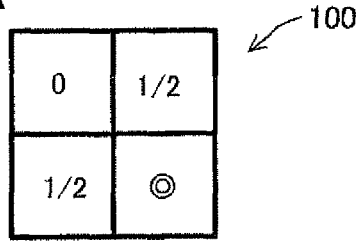
FIGS. 1A through 1D are explanatory diagrams conceptually illustrating a problem that occurs when compressing and decompressing error values according to a conventional technique.
Figure 1B:
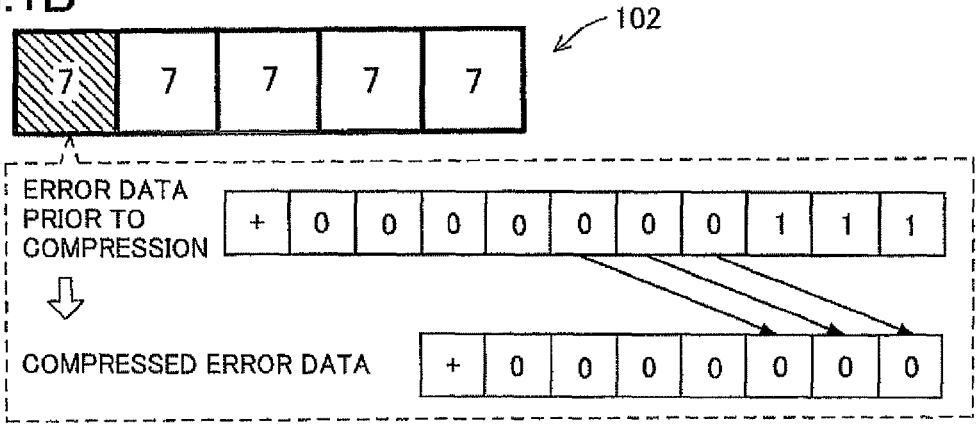
Figure 1C:
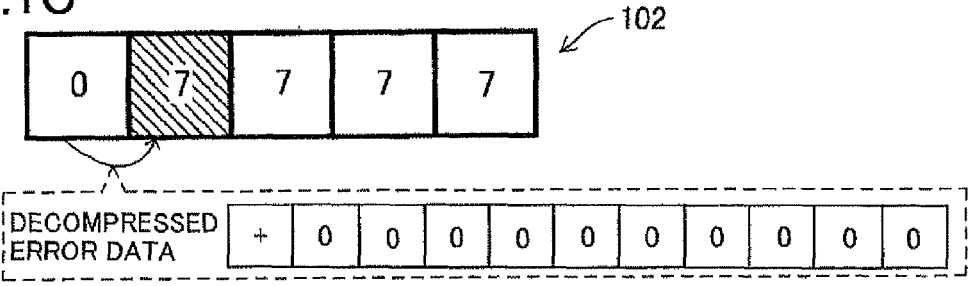
Figure 1D:
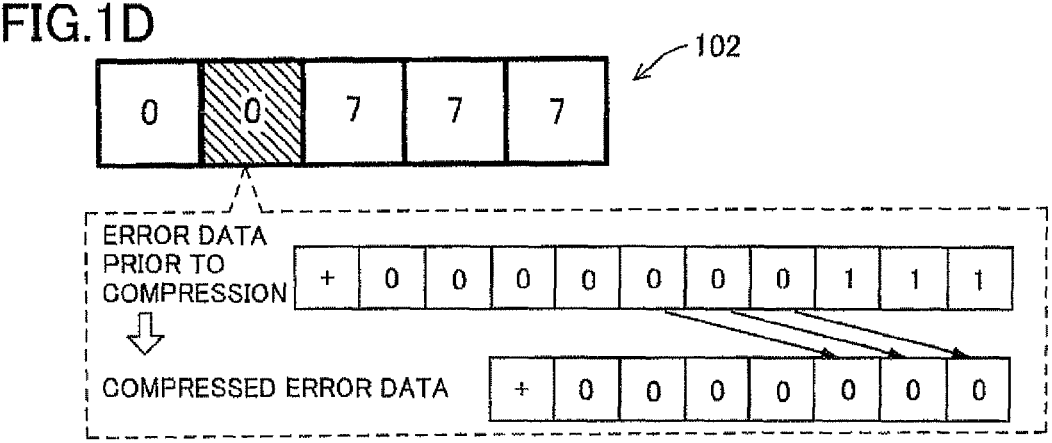
Figure 2:
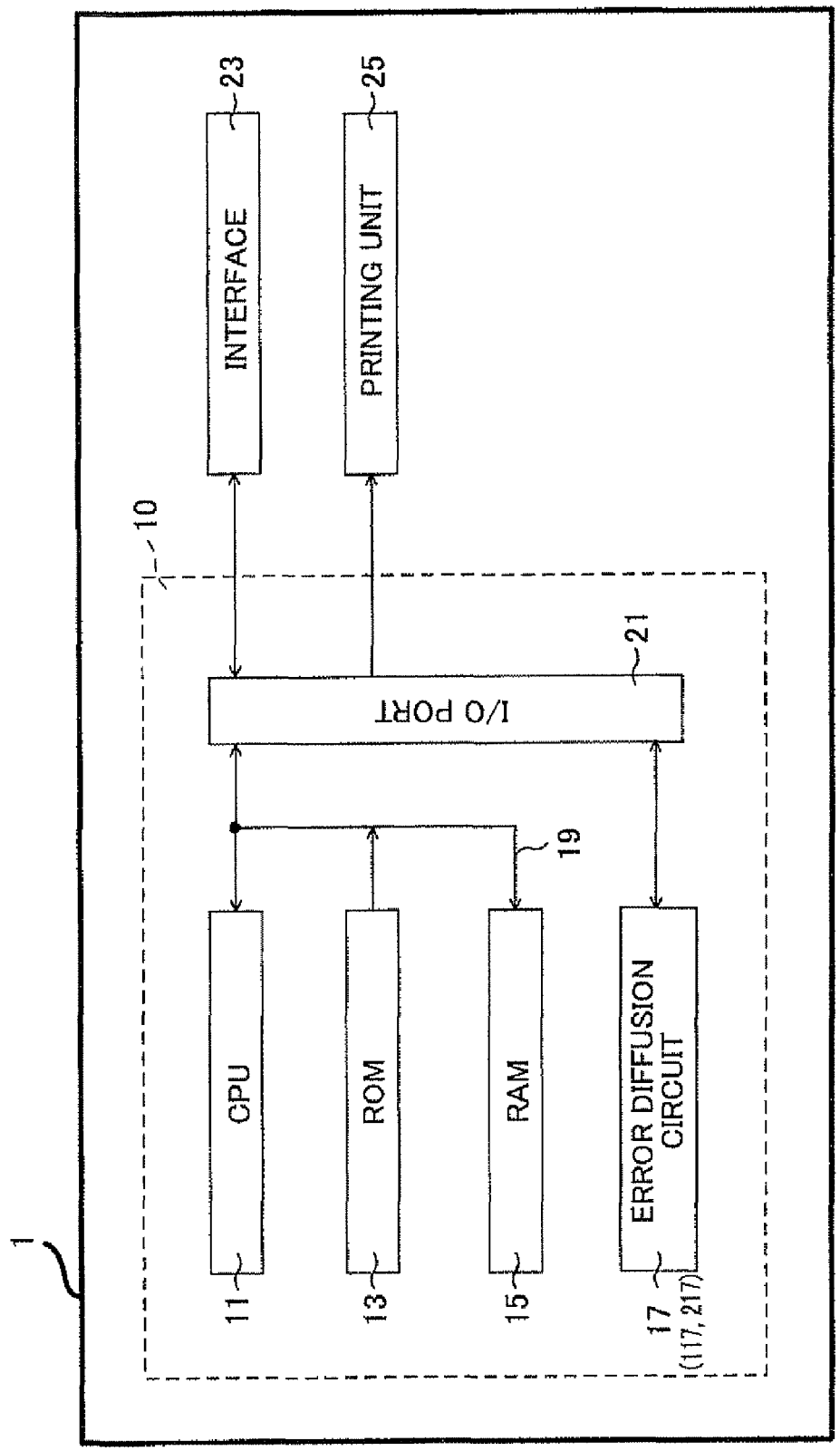
FIG. 2 is a block diagram conceptually illustrating an electrical structure of a printer according to a first embodiment of the present invention.

Next, a first embodiment of the present invention will be described while referring to the accompanying drawings. FIG. 2 is a block diagram conceptually illustrating the electrical structure of a printer 1 serving as the preferred embodiment of the image processor according to the present invention. The printer 1 is capable of executing a thresholding process (a binarization process) based on error diffusion and is configured to reduce the occurrence of tone jump at low densities in an image to prevent a decline in image quality, while conserving memory usage.

The printer 1 is an inkjet printer that primarily includes a controller 10, an interface 23, and a printing unit 25. The controller 10 further includes a CPU 11, a ROM 13, and a RAM 15, all of which are connected to an I/O port 21 via a bus line 19. The controller 10 is also provided with an error diffusion circuit 17 connected to the I/O port 21. The interface 23 and printing unit 25 are also connected to the I/O port 21. The controller 10 executes a thresholding process with the error diffusion circuit 17 on a halftone image inputted via the interface 23, for example, and drives the printing unit 25 based on the data produced from this thresholding process. While not shown in the drawings, the printing unit 25 includes a conveying mechanism for conveying sheets of a recording paper, and an image-forming mechanism for ejecting ink droplets on the conveyed sheets of recording paper based on signals received from the controller 10. The printing unit 25 forms a binary image based on commands received from the controller 10 by setting dot output to ON or OFF for each pixel to simulate tones in a halftone image.

The CPU 11 controls each function of the printer 1 and each component connected to the I/O port 21 based on fixed values and programs stored in the ROM 13 and the like or various signals exchanged via the interface 23. The ROM 13 is a non-writable memory that stores the control programs executed by the CPU 11, and other data. The RAM 15 is a volatile memory that allows data to be overwritten. The error diffusion circuit 17 implements a thresholding process based on error diffusion.

Figure 3:
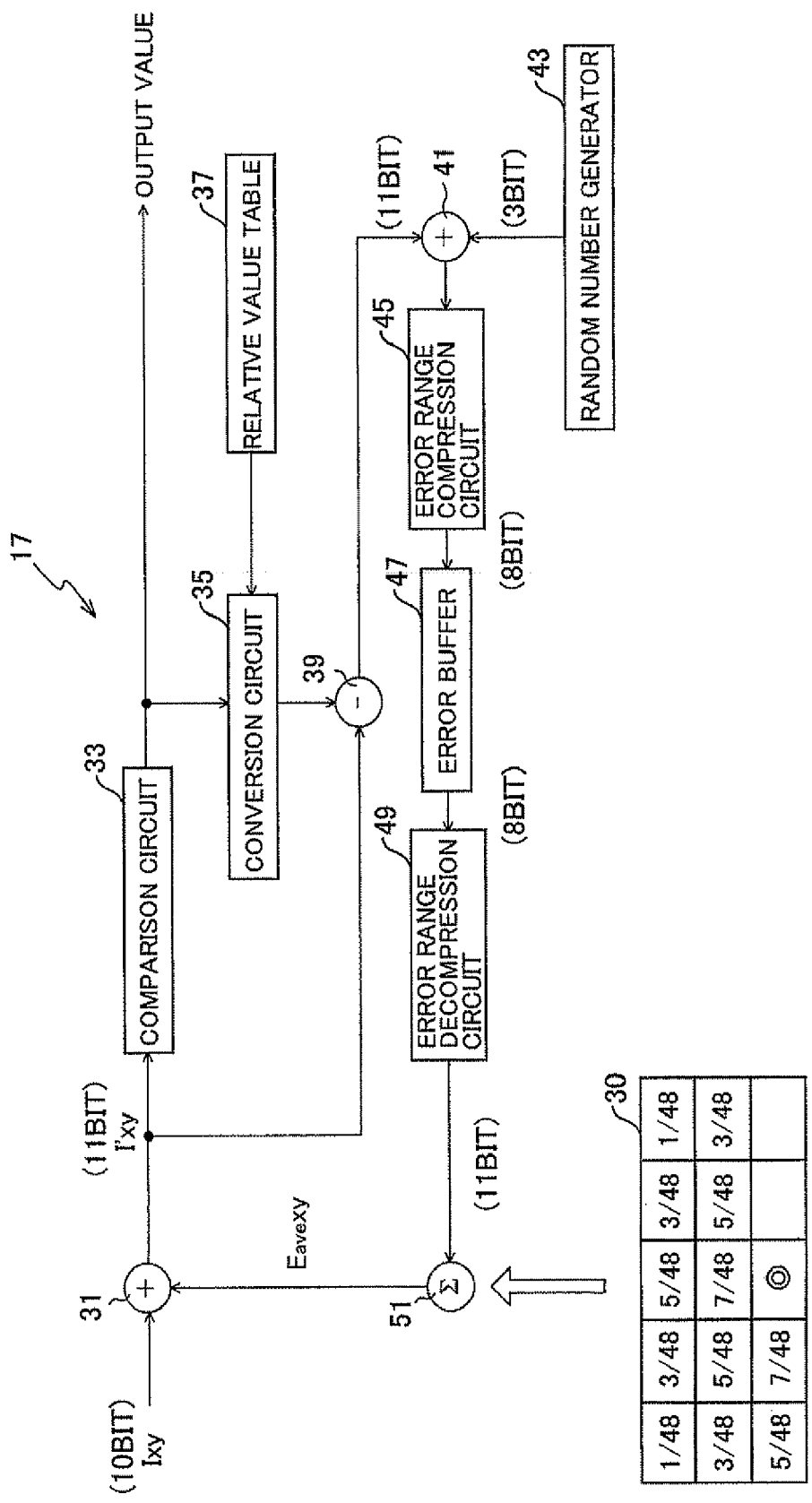
FIG. 3 is a block diagram conceptually illustrating a structure of the error diffusion circuit according to the first embodiment.
Figure 4:
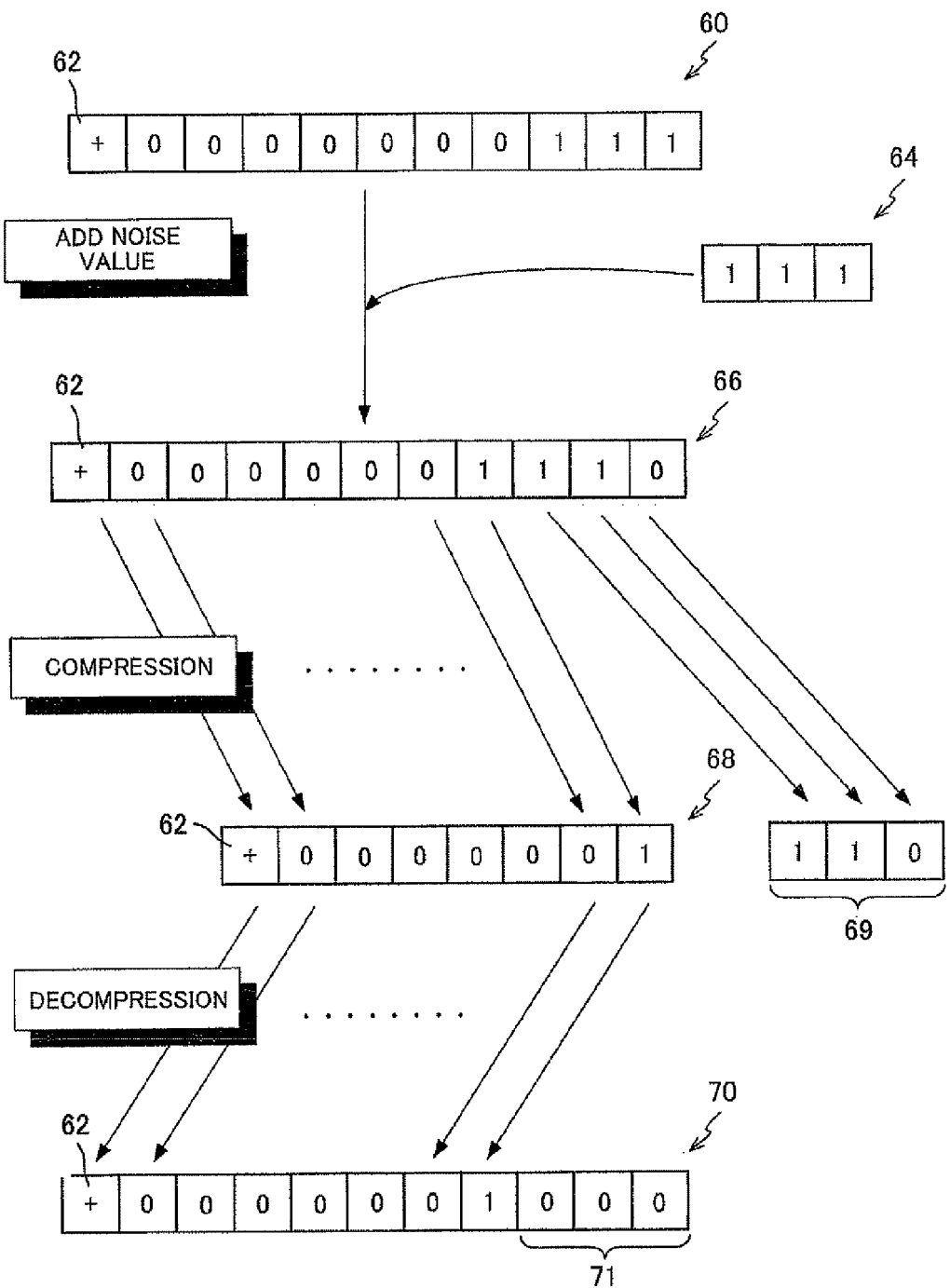
FIG. 4 is an explanatory diagram conceptually illustrating how error data is processed in the error diffusion circuit according to the first embodiment.

FIG. 3 is a block diagram conceptually illustrating the structure of the error diffusion circuit 17 according to the first embodiment. FIG. 4 is an explanatory diagram conceptually illustrating how error data is processed in the error diffusion circuit 17 according to the first embodiment. Next, the error diffusion circuit 17 will be described in detail with reference to FIGS. 3 and 4.

The error diffusion circuit 17 processes each pixel of a halftone image by sequentially setting each pixel as the target pixel and converting the density of the target pixel to either an output value of "1" indicating "dot output" or an output value of "0" indicating "no dot output." The pixel density represents a gradation level for the target pixel. The error diffusion circuit 17 is provided with a diffusion matrix 30, a correction circuit 31, a comparison circuit 33, a conversion circuit 35, a relative value table 37, a subtractor 39, a noise adder 41, a random number generator 43, an error range compression circuit 45, an error buffer 47, an error range decompression circuit 49, and an error summing circuit 51.

The diffusion matrix 30 is a filter that defines the weighting coefficients used for passing on (or adding) error data of peripheral pixels to the target pixel. The symbol "⊚" in the diffusion matrix 30 denotes the matrix element corresponding to the target pixel, while all elements of the diffusion matrix 30 with weighting coefficients are treated as peripheral pixels of the target pixel.

The correction circuit 31 corrects the density of the target pixel based on the error data for its peripheral pixels and outputs the corrected density. More specifically, the correction circuit 31 calculates a corrected pixel density I'xy for the target pixel according to Equation (1) below, where Ixy is the pixel density Ixy of the target pixel prior to correction and $E_{ave}xy$ is the correction value calculated based on the error data for the peripheral pixels.

$$I'xy = Ixy + E_{ave}xy \quad (1)$$

The correction value $E_{ave}xy$ is a value that the error summing circuit 51 calculates based on error data for peripheral pixels and the corresponding weighting coefficients in the diffusion matrix 30. The correction value $E_{ave}xy$ will be described later in greater detail.

The comparison circuit 33 calculates an output value based on the corrected pixel density I'xy of the target pixel obtained using Equation (1), and outputs the output value. The output value indicates whether or not to output a dot. Specifically, the comparison circuit 33 compares the corrected pixel density I'xy to a threshold value and outputs a "1" indicating "dot output" if the corrected pixel density I'xy is greater than or equal to the threshold value and a "0" indicating "no dot output" if the corrected pixel density I'xy is less than the threshold value.

The comparison circuit 33 also references the pixel density Ixy of the target pixel prior to calibration (hereinafter referred to as the "pre-correction pixel density Ixy"). If the pre-correction pixel density Ixy is "0", the comparison circuit 33 outputs a "0", regardless of whether the corrected pixel density I'xy exceeds the threshold value.

In the preferred embodiment, the pre-correction pixel density Ixy for each target pixel is a positive integer within a 10-bit range (i.e., between 0 and 1023). Further, the corrected pixel density I'xy is an integer within an 11-bit range, including a sign bit (i.e., between −1024 and 1023). If the corrected pixel density I'xy calculated according to Equation (1) is longer than 11 bits, the correction circuit 31 rounds the density value to an integer within an 11-bit range by truncating the least significant digits that extend beyond 11 bits, and outputs the result as the corrected pixel density I'xy.

The conversion circuit 35 converts the value outputted from the comparison circuit 33 to a relative value and outputs the result. Specifically, the conversion circuit 35 converts the output value "1" to the relative value "1023" and converts the output value "0" to the relative value "0" and outputs the relative value. The correlations between output values and relative values are pre-recorded in the relative value table 37.

The subtractor 39 calculates error data for the target pixel corresponding to the difference between the corrected density of the target pixel and the output relative value, and outputs the difference. More specifically, the subtractor 39 sets 11-bit error data to a value resulting from subtracting the relative value outputted by the conversion circuit 35 from the corrected pixel density I'xy, and outputs the 11-bit error data.

Thereafter, the error range compression circuit 45 irreversibly compresses the 11-bit error data outputted by the subtractor 39 to 8-bit error data and stores this 8-bit error data in the error buffer 47. The error range decompression circuit 49 subsequently read this data from the error buffer 47 and restores the 8-bit data to 11-bit error data. The 11-bit error data will be used to calculate a correction value $E_{ave}xy$ for correcting the density of another target pixel.

This process of compressing 11-bit error data to 8 bits and subsequently restoring the 8-bit data to 11 bits produces round-off error of 3 bits (11−8=3) in the restored error data. To compensate for this round-off error, the error diffusion circuit 17 of the preferred embodiment is provided with a noise adder 41 on the input side of the error range compression circuit 45. By adding a noise value to the error data prior to compression, the noise adder 41 can mitigate the effect of the round-off error with respect to the dot output. This process will be described next in greater detail with reference to FIG. 4.

A bit string 60 shown in FIG. 4 illustrates an example of error data calculated by the subtractor 39. The first bit in the bit string 60 is a sign bit 62 indicating whether the error data is positive or negative. The remaining 10 bits of the bit string 60 (i.e., the bits excluding the sign bit 62) represent the absolute value of the error data.

The noise adder 41 shown in FIG. 3 adds a random integer value represented in a bit string 64 of 3 bits (i.e., a value between 0 and 7) to the absolute value of the error data as a noise value. In other words, the noise adder 41 adds a random number between −7 and 7 to the error data as the noise value on a pixel basis before the error data is compressed.

A bit string 66 represents the error data after the noise bit string 64 has been added. Subsequently, the error range compression circuit 45 compresses the 11-bit bit string 66 with the added noise value to an 8-bit bit string 68 by shifting the bit string 66 to the right by 3 bits. This compression is irreversible since the least significant 3 bits of the bit string 66, represented by a bit string 69 in FIG. 4, are discarded. The error range compression circuit 45 stores the high-order 8-bit bit string 68 in the error buffer 47 as compressed error data.

A bit string 70 in FIG. 4 represents the error data restored by the error range decompression circuit 49 shown in FIG. 3. The error range decompression circuit 49 restores the 8-bit bit string 68 to the 11-bit bit string 70 by shifting the bit string 68 read from the error buffer 47 3 bits to the left, producing an empty bit string 71 that constitutes the low-order 3 bits of the bit string 70, and subsequently adding a "0" to each of the bits in the bit string 71.

By compressing and decompressing error data in this way, 3 bits worth of precision is lost from the error data prior to compression. That is, a round-off error within the range from −7 to 7 is produced. For example, since the error data represented by the bit string 60 in FIG. 4 is "7" prior to adding the noise value, if the noise value is not added, the error data becomes "0" when compressed by shifting the data 3 bits to the right. Hence, the restored error data will also be "0". Thus, all error data within the range of the round-off error (−7 to 7 in the preferred embodiment) is reset to "0" and cannot be accumulated when the noise value is not added.

However, the error diffusion circuit 17 according to the first embodiment adds a noise value to the error data prior to compression. Therefore, even when the absolute value of the error data is "7" or less, the absolute value is sometimes increased to "8" or greater when adding a noise value. That is, in some cases a "1" is carried to the high-order 8 bits by adding the noise value to the absolute value of the noise data, as in the bit string 66 in the example of FIG. 4. As a result, the absolute value of the error data after compression is "1" or greater, as in the bit string 68 in the example of FIG. 4, resulting in an absolute value of "8" or greater after the error data is decompressed, as in the bit string 70 in the example of FIG. 4. Thus, the error diffusion circuit 17 according to the first embodiment can prevent compression and decompression from always changing the error data to "0", even when the error data prior to compression is not "0".

Returning to the description of the error diffusion circuit 17 in FIG. 3, the noise adder 41 functions to add a random positive integer to the absolute value of the error data outputted by the subtractor 39. The random positive integer is generated from the random number generator 43 within the range 0-7. In other words, the noise adder 41 adds a random integer between −7 and 7 to the error data as a noise value, thereby ensuring that the random noise value added to the error data varies from pixel to pixel. Adding a random number as the noise value ensures that the effect of the noise value on dot output is irregular, preventing a decline in image quality.

Here, the range of noise values that the noise adder 41 can add is preferably equivalent to the range of round-off error that is produced by compressing and decompressing error data. Hence, when the error range compression circuit 45 right-shifts the error data by N bits, the noise adder 41 is preferably configured to add an absolute value within the range of N bits to the absolute value of the error data. In this way, the noise adder 41 can suitably compensate for the precision lost by irreversibly compressing the error data. In the first embodiment, the error range compression circuit 45 shifts the error data by 3 bits, and the noise adder 41 adds the absolute value within the range of 3 bits to the error data.

The random number generator 43 is not limited to any specific algorithm for generating random values, provided that the random number generator 43 can generate pseudo-random numbers. For example, the random number generator 43 may generate and output a random number according to a maximal length sequence (M-sequence) technique or the like, or may read a value from a storage device storing a preset sequence of numbers and output the value as a random value.

The error range compression circuit 45 irreversibly compresses the error data for the target pixel and outputs the compressed error data. Specifically, the error range compression circuit 45 shifts the error data for the target pixel with the added noise right by 3 bits in order to compress the data quantity from 11 bits to 8 bits. In other words, the error range compression circuit 45 divides the error data for the target pixel after noise has been added by "8" in the first embodiment and outputs the result as the compressed error data.

By irreversibly compressing the error data for the target pixel, the error range compression circuit 45 can achieve a high compression ratio, thereby greatly reducing the amount of memory required by the error buffer 47.

The error buffer 47 stores the compressed error data. Since one pixel worth of error data is compressed to 8 bits according to the process described above, memory allocated for the error buffer 47 is equivalent to [(8 bits)×(number of pixels in one raster of the halftone image)×(vertical dimension of the diffusion matrix ("3" in the example of FIG. 3))].

The error range decompression circuit 49 reads a plurality of sets of the error data for pixels designated as a plurality of peripheral pixels with respect to the next target pixel from the error buffer 47, and restores and outputs the plurality of error data sets. Specifically, the error range decompression circuit 49 left-shifts the plurality of error data sets for the plurality of peripheral pixels read from the error buffer 47 by 3 bits, stores a "0" in each of the low-order 3 bits, and outputs the result. In other words, the error range decompression circuit 49 outputs a value obtained by multiplying each of the error data sets read from the error buffer 47 by "8" to decompress the error data sets for the peripheral pixels, and outputs the result as error data E.

The error summing circuit 51 collects restored the error data set for each peripheral pixel, calculates a correction value $E_{ave}xy$ based on the corresponding weighting coefficients defined in the diffusion matrix 30, and outputs the resulting value. More specifically, the error summing circuit 51 calculates the correction value $E_{ave}xy$ according to Equation (2), where $K_{ij}$ (i indicating the horizontal size and j the vertical size of the diffusion matrix 30; i=5 and j=3 in the preferred embodiment) is the weighting coefficient of the diffusion matrix 30 corresponding to the peripheral pixel and $E_{ij}$ is the restored error data for the peripheral pixel at the position corresponding to the weighting coefficient.

$$Eavexy = \Sigma(Kij \times Eij) \quad (2)$$

The correction circuit 31 described above will correct the density of the next target pixel using the correction value $E_{ave}xy$ outputted by the error summing circuit 51.

With the error diffusion circuit 17 of the printer 1 according to the first embodiment, the error data for a pixel is compressed after adding a noise value. Therefore, even though some of the precision is lost when a part of error data is irreversibly truncated during compression, the error diffusion circuit 17 can prevent a case in which all decompressed error data is "0". Consequently, the correction value $E_{ave}xy$ calculated according to Equation (2) above will not always be "0" and, hence, error in peripheral pixels can be passed on (or added) to the next target pixel.

Figure 5A:
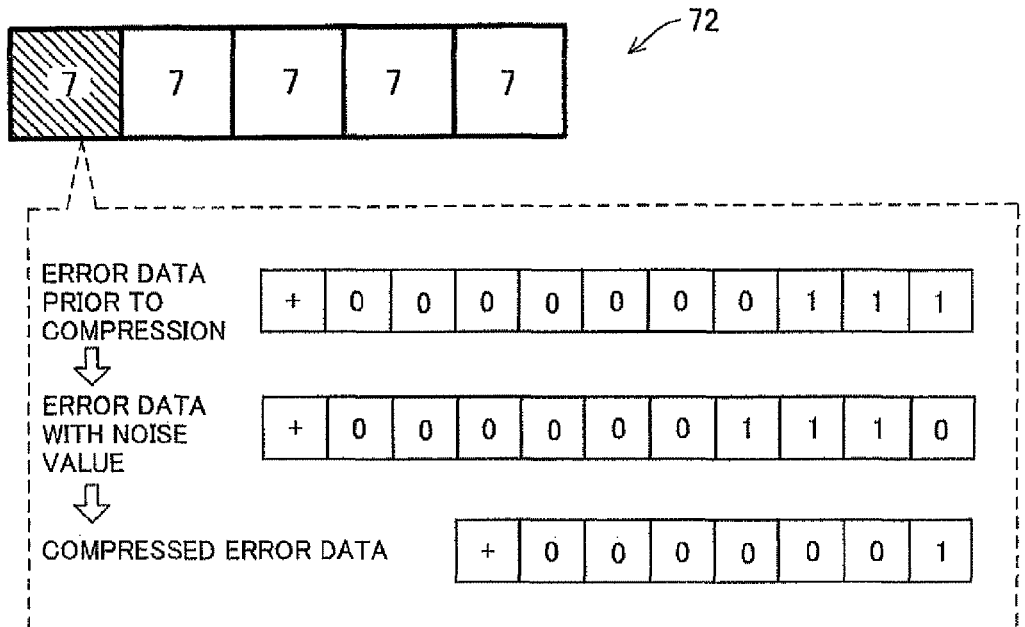
FIGS. 5A through 5C conceptually illustrate effects of thresholding performed by the error diffusion circuit according to the first embodiment
Figure 5B:
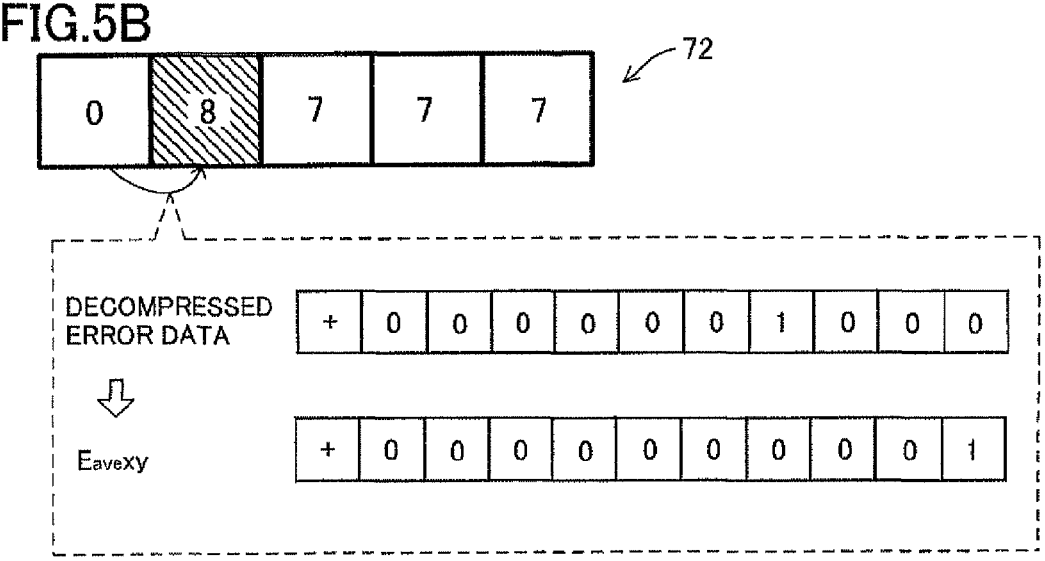

FIGS. 5A and 5B conceptually illustrate the effects of thresholding performed by the error diffusion circuit 17 on a single raster 72 in the halftone image. In the example of FIG. 5A, each pixel in the raster 72 has a density of "7" prior to the thresholding process. In the following description, the threshold value compared to the corrected pixel density I'xy in the comparison circuit 33 of FIG. 3 is "8", and output values of "1" and "0" are respectively converted to relative values of "1023" and "0" in the conversion circuit 35 of FIG. 3.

FIG. 5A shows a case in which the leftmost pixel in the raster 72 is set as the first target pixel for thresholding. Since this target pixel has no peripheral pixels, the comparison circuit 33 simply compares the density value "7" for the target pixel to the threshold value "8". Since the density value "7" is less than the threshold value "8", the conversion circuit 35 converts the density to the output value "0" indicating "no dot output." Next, the subtractor 39 subtracts the relative value of "0" from the density "7" to calculate an error value of "7". Hence, the error diffusion circuit 17 calculates the error data to be $(+0000000111)_2$. Next, the noise adder 41 adds a noise value generated randomly by the random number generator 43 to this calculated error data. In this example, it will be assumed that the noise value added to the error data is "7". Subsequently, the error range compression circuit 45 right-shifts the error data by 3 bits to compress the data and stores the compressed error data of $(+0000001)_2$ in the error buffer 47.

FIG. 5B shows the state of the raster 72 after the density of the pixel set as the second target pixel has been corrected based on the error data of the first target pixel. In this case, the error range decompression circuit 49 reads the error data of the first processed pixel from the error buffer 47 and left-shifts the data 3 bits to produce the 11-bit error data $(+0000001000)_2$. Next, the error summing circuit 51 multiplies the decompressed error data "8" by the corresponding weighting coefficient "7/48" defined in the diffusion matrix 30 to produce the value "1.1666 . . . " as the correction value $E_{ave}xy$. In this description, the correction value $E_{ave}xy$ will be treated as an 11-bit integer including a sign bit for simplification. Hence, the correction value $E_{ave}xy$ of $(+0000000001)_2$ is added to the density of the second target pixel, resulting in a corrected density of "8" for the second target pixel.

Figure 5C:
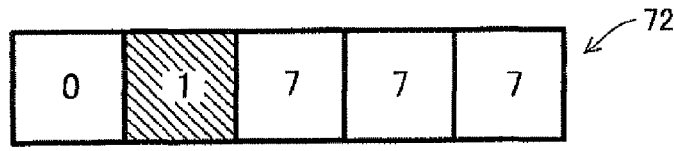

FIG. 5C conceptually illustrates the raster 72 after the second target pixel has undergone the thresholding process. Since the corrected density of the second target pixel is "8" that is equal to the threshold value "8", the density of the pixel is converted to "1".

In this way, the error diffusion circuit 17 according to the first embodiment can accumulate error to generate dots, even when error data prior to compression falls within the range of the round-off error for data lost through compression and decompression, thereby suppressing tone jump at low densities in an image. Further, by adding different noise values to the error data for each pixel, dots appear in irregular positions, which is not possible when adding a uniform value to the error data. Hence, the error diffusion circuit 17 can suppress a decline in image quality.

Further, the error diffusion circuit 17 adds a noise value to the error data before compressing the error data. After decompressing the error data, the error diffusion circuit 17 multiplies the error data by the corresponding coefficient in the diffusion matrix 30 before the error data is added to the density of the next target pixel. Hence, the noise value added according to the method of the first embodiment is less likely to directly influence dot output and, thus, is unlikely to disturb image quality, which might occur if the noise value were directly added to the density or threshold value.

Next, a second embodiment of the present invention will be described with reference to FIGS. 6 through 8C. In the first embodiment described above, a noise value is added to error data for mitigating the effect of the round-off error before the error data is compressed. On the other hand, in the second embodiment, a noise value is added to error data for mitigating the effect of the round-off error after the error data is decompressed.

Figure 6:
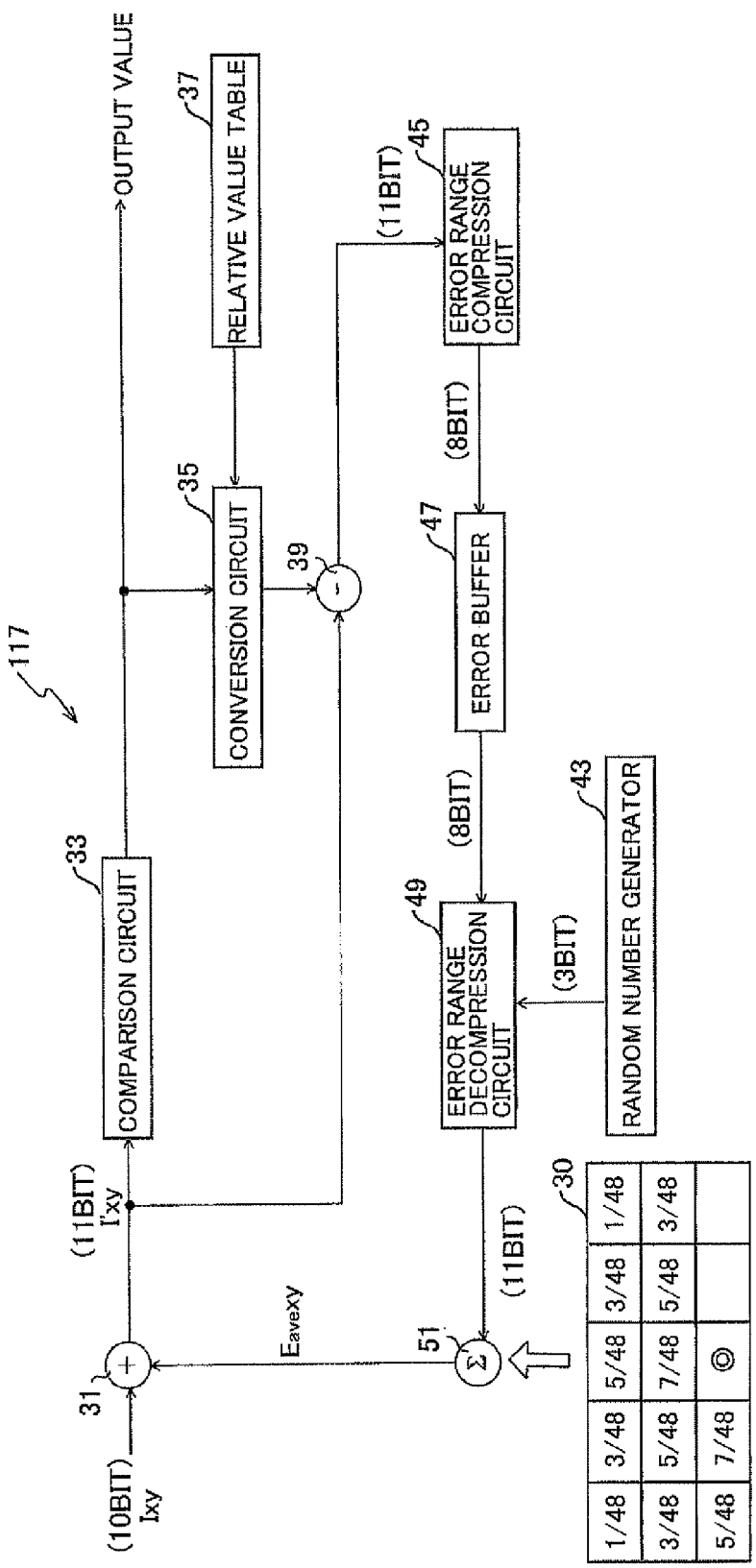
FIG. 6 is a block diagram conceptually illustrating the structure of the error diffusion circuit according to a second embodiment.
Figure 7:
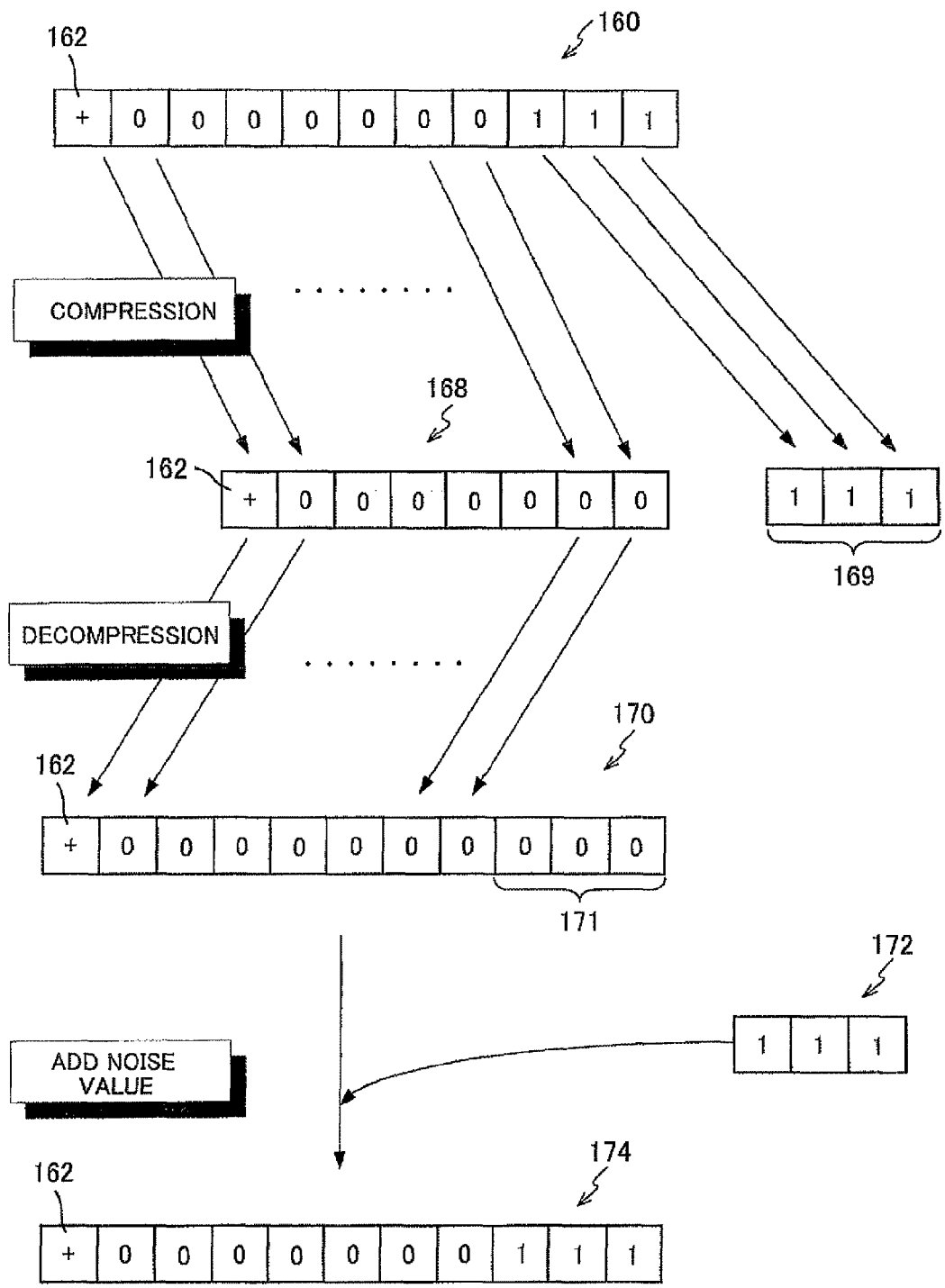
FIG. 7 is an explanatory diagram conceptually illustrating how error data is processed in the error diffusion circuit according to the second embodiment.

Since an electrical structure of a printer according to the second embodiment is the same as that of the printer 1 of the first embodiment, an explanation for the electrical structure of the printer according to the second embodiment is omitted. FIG. 6 corresponds to FIG. 3 of the first embodiment and is a block diagram conceptually illustrating the structure of an error diffusion circuit 117 according to the second embodiment, wherein like parts and components are designated with the same reference numerals to avoid duplicating description. FIG. 7 is an explanatory diagram conceptually illustrating how error data is processed in the error diffusion circuit 117 according to the second embodiment.

As shown in FIG. 6, in the second embodiment, the error diffusion circuit 117 does not include the noise adder 41 of the first embodiment and the random number generator 43 is configured to provide a random positive integer to the error range decompression circuit 49. Hence, the error range compression circuit 45 receives error data for a target pixel without a noise value from the subtractor 39 and shifts the error data for the target pixel by 3 bits in order to compress the data quantity from 11 bits to 8 bits. Then, the compressed error data is stored in the error buffer 47.

The error range decompression circuit 49 reads a plurality of sets of error data for pixels designated as a plurality of peripheral pixels of the next target pixel from the error buffer 47 and decompresses these error data sets. The error range decompression circuit 49 also adds a noise value generated by the random number generator 43 to the decompressed error data set for each peripheral pixel and outputs the results. Specifically, the error range decompression circuit 49 left-shifts the error data sets for peripheral pixels read from the error buffer 47 by 3 bits, i.e., multiplies the error data sets by "8", and outputs the result as the decompressed error data sets for the peripheral pixels.

Next, the error range decompression circuit 49 adds the random positive integer generated by the random number generator 43 within a range from 0 to 7 to the absolute value of the decompressed error data. In other words, the error range decompression circuit 49 adds a random integer between −7 and 7 to the error data set of each peripheral pixel as a noise value on a pixel basis. The error range decompression circuit 49 acquires one random number for each peripheral pixel and adds this value to the error data set of each peripheral pixel as a noise value. Hence, the noise value added to the error data sets of peripheral pixels varies from pixel to pixel.

By setting the range of noise values equivalent to the range of round-off error that is produced when compressing and decompressing error data, the error range decompression circuit 49 can suitably compensate for the precision lost by irreversibly compressing the error data. When the error range compression circuit 45 right-shifts the error data by N bits (where N is an integer greater than 0), the error range decompression circuit 49 is preferably configured to add an absolute value within the range of N bits to the absolute value of the error data.

As described above, the error diffusion circuit 117 according to the second embodiment mitigates the effect that round-off error has on dot output by adding a noise value that varies from pixel to pixel to the error data set for each peripheral pixel decompressed by the error range decompression circuit 49. This process will be described next in greater detail with reference to FIG. 7.

A bit string 160 shown in FIG. 7 illustrates an example of error data calculated by the subtractor 39. The first bit in the bit string 160 is a sign bit 162 indicating whether the error data is positive or negative. The remaining 10 bits of the bit string 160 (i.e., the bits excluding the sign bit 162) represent the absolute value of the error data.

The error range compression circuit 45 compresses the 11-bit bit string 160 to an 8-bit bit string 168 by shifting the bit string 160 to the right by 3 bits. This compression is irreversible since the least significant 3 bits of the bit string 160, represented by a bit string 169 in FIG. 7, are discarded. The error range compression circuit 45 stores the high-order 8-bit bit string 168 in the error buffer 47 as compressed error data.

A bit string 70 in FIG. 7 represents the error data restored by the error range decompression circuit 49 shown in FIG. 6. The error range decompression circuit 49 restores the 8-bit bit string 168 to the 11-bit bit string 170 by shifting the bit string 168 read from the error buffer 47 3 bits to the left, producing an empty bit string 171 that constitutes the low-order 3 bits of the bit string 170, and subsequently adding a "0" to each of the bits in the bit string 171.

By compressing and decompressing error data in this way, 3 bits worth of precision is lost from the error data, that is, a round-off error within the range from −7 to 7 is produced. For example, when the error data calculated by the subtractor 39 is "7", as in the bit string 160 shown in the example of FIG. 7, the error data becomes "0" when compressed and decompressed. Thus, all error data within the range of the round-off error (−7 to 7 in the second embodiment) is reset to "0" and cannot be accumulated when a noise value is not added after decompression.

However, as described above, the error diffusion circuit 117 according to the second embodiment adds a random integer value represented by a 3-bit bit string 172 (i.e., an integer between 0 and 7) to the absolute value of the decompressed error data as a noise value. A noise value generated by the random number generator 43 is added to the error data for each peripheral pixel after the error data has been decompressed to 11 bits. In other words, the error diffusion circuit 117 adds a random number between −7 and 7 generated by the random number generator 43 as a noise value to the decompressed error data for each peripheral pixel.

A bit string 174 in FIG. 7 represents the error data for a peripheral pixel after the bit string 172 was added as a noise value. By adding a noise value in this way, the error diffusion circuit 117 of the second embodiment can produce error data with an absolute value of "1" or greater, even when the absolute value of the error data prior to compression was "7" or less, resulting in error data of "0" after decompression. Thus, the error diffusion circuit 117 can prevent compression and decompression from always reducing the error data for peripheral pixels to "0", even when the error data prior to compression is not "0".

By adding a noise value to error data for each peripheral pixel after decompressing the error data, the error diffusion circuit 117 of the printer 1 according to the second embodiment can reduce the occurrence of cases in which all error data sets for peripheral pixels is "0". As a result, the correction value $E_{ave}xy$ will not be calculated as "0" according to Equation (2) in the first embodiment, enabling the printer 1 to pass on error in peripheral pixels to the next target pixel.

Figure 8A:
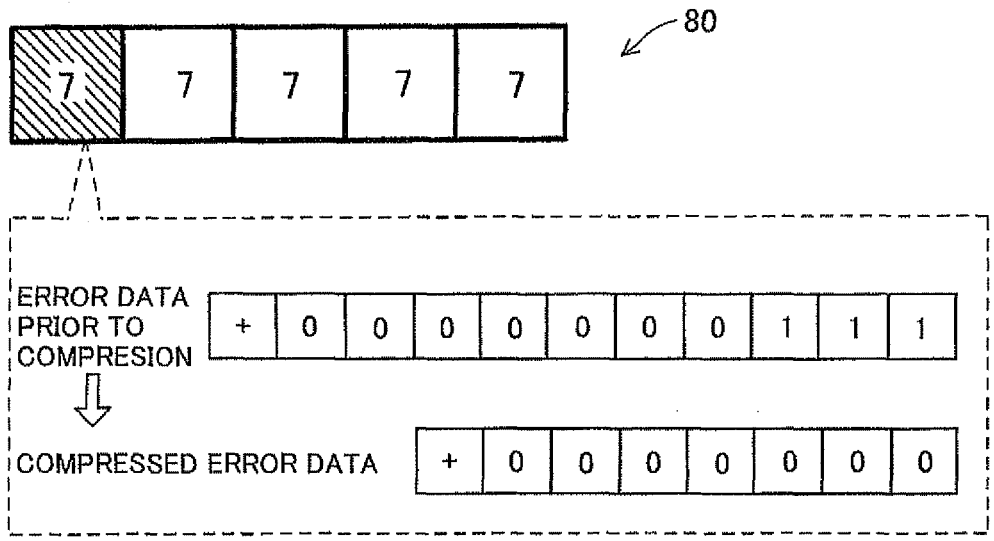
FIGS. 8A and 8B conceptually illustrate effects of thresholding performed by the error diffusion circuit according to the second embodiment.
Figure 8B:
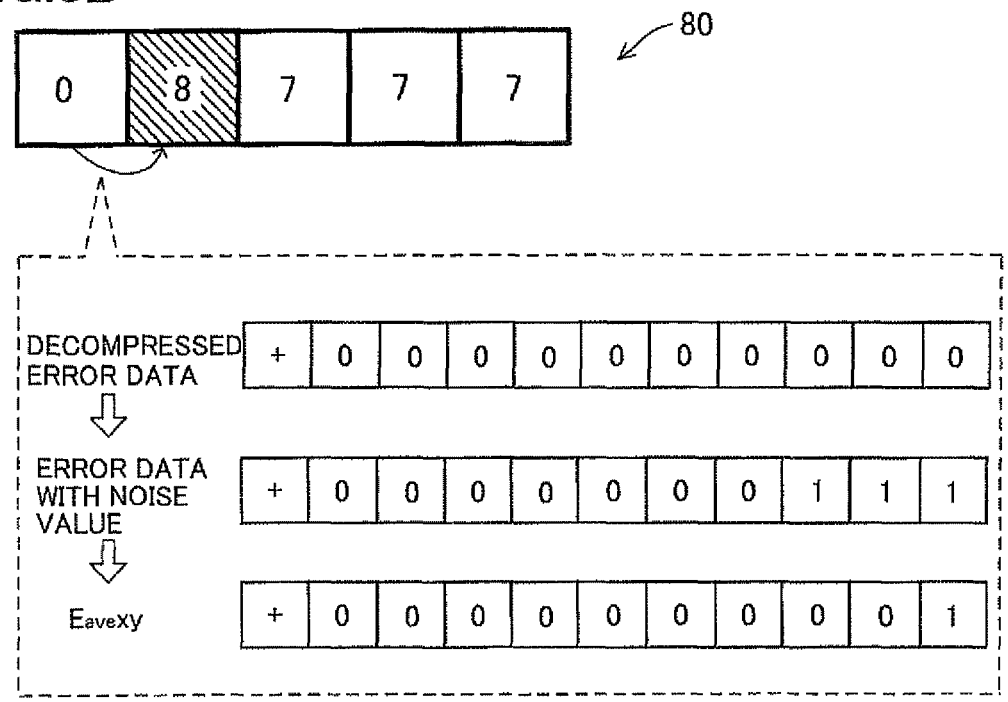

FIGS. 8A and 8B conceptually illustrate the effects of thresholding performed by the error diffusion circuit 117 on a single raster 80 in the halftone image. In the example of FIG. 8A, each pixel in the raster 80 has a density of "7" prior to the thresholding process. In the following description, the threshold value compared to the corrected pixel density I'xy in the comparison circuit 33 of FIG. 6 is "8", and output values of "1" and "0" are respectively converted to relative values of "1023" and "0" in the conversion circuit 35 of FIG. 6.

FIG. 8A shows a case in which the leftmost pixel in the raster 80 is set as the first target pixel for thresholding. Since this target pixel has no peripheral pixels, the comparison circuit 33 simply compares the density value "7" for the target pixel to the threshold value "8". Since the density value "7" is less than the threshold value "8", the conversion circuit 35 converts the density to the output value "0" indicating "no dot output." Next, the subtractor 39 subtracts the relative value of "0" from the density "7" to calculate an error value of "7". Hence, the error diffusion circuit 17 calculates the error data to be $(+0000000111)_2$. Subsequently, the error range compression circuit 45 right-shifts the error data by 3 bits to compress the data and stores the compressed error data of $(+0000000)_2$ in the error buffer 47.

FIG. 8B shows the state of the raster 80 after the density of the pixel set as the second target pixel has been corrected based on the error data of the first target pixel. In this case, the error range decompression circuit 49 reads the error data of the first processed pixel from the error buffer 47 and left-shifts the data 3 bits to produce the 11-bit error data $(+0000000000)_2$. Next, the error range decompression circuit 49 adds a noise value generated randomly by the random number generator 43 to this decompressed error data. Specifically, the error range decompression circuit 49 adds "7" in this example to the decompressed error data "0" as a noise value, resulting in the error data $(+0000000111)_2$ for the peripheral pixel.

Next, the error summing circuit 51 multiplies the error data "7" after adding the noise value by the corresponding weighting coefficient "7/48" defined in the diffusion matrix 30 to produce the value "1.020 . . . " as the correction value $E_{ave}xy$. In this description, the correction value $E_{ave}xy$ will be treated as an 11-bit integer including a sign bit for simplification. Hence, the correction value $E_{ave}xy$ of $(+0000000001)_7$ is added to the density of the second target pixel, resulting in a corrected density of "8" for the second target pixel.

Figure 8C:
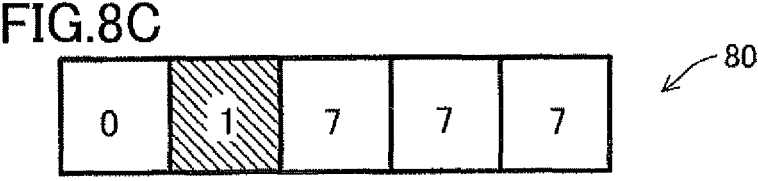
FIG. 8C conceptually illustrates the raster after the second target pixel has undergone the thresholding process.

FIG. 8C conceptually illustrates the raster 80 after the second target pixel has undergone the thresholding process. Since the corrected density of the second target pixel is "8" that is equal to the threshold value "8", the density of the pixel is converted to "1".

In this way, the error diffusion circuit 117 according to the second embodiment can accumulate error to generate dots, even when error data prior to compression falls within the range of the round-off error for data lost through compression and decompression, thereby suppressing tone jump at low densities in an image. Further, by adding different noise values to the error data for each peripheral pixel, dots appear in irregular positions, which is not possible when adding a uniform value to the error data. Hence, the error diffusion circuit 17 can suppress a decline in image quality.

Further, while the error diffusion circuit 117 adds a noise value to error data for each peripheral pixel, this error data with the added noise value is subsequently multiplied by a corresponding weighting coefficient in the diffusion matrix 30 before being added to the density of the target pixel. Hence, the noise value added according to the method of the second embodiment is less likely to directly influence dot output and, thus, is unlikely to disturb image quality, which might occur if the noise value were directly added to the density or threshold value.

Next, a third embodiment of the present invention will be described with reference to FIGS. 9 through 12.

Figure 10:
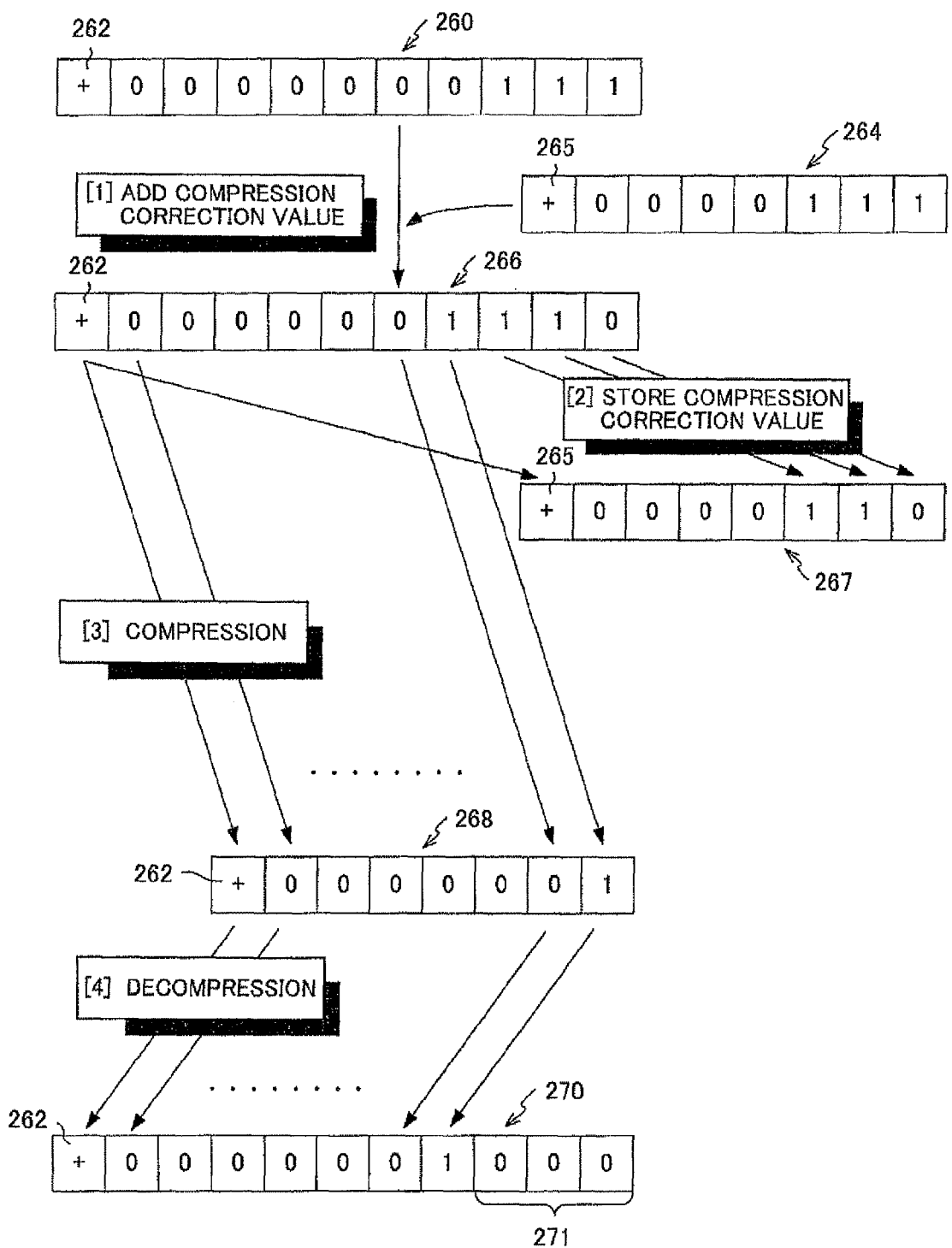
FIG. 10 is an explanatory diagram conceptually illustrating how error data is processed in the error diffusion circuit according to the third embodiment.

Since an electrical structure of a printer according to the third embodiment is the same as that of the printer 1 of the first embodiment, an explanation for the electrical structure of the printer according to the second embodiment is omitted. FIG. 9 corresponds to FIG. 3 of the first embodiment and is a block diagram conceptually illustrating the structure of an error diffusion circuit 217 according to the third embodiment, wherein like parts and components are designated with the same reference numerals to avoid duplicating description. FIG. 10 is an explanatory diagram conceptually illustrating how error data is processed in the error diffusion circuit 217 according to the second embodiment.

As shown in FIG. 9, the error diffusion circuit 217 according to the third embodiment includes an error range compression buffer 53 and a diffusion matrix 230 in place of the noise adder 41, the random number generator 43, and the diffusion matrix 30 in the first embodiment.

In the first embodiment described above, a noise value generated from the random number generator 43 is added to error data by the noise adder 41 prior to compression for mitigating the effect of the round-off error. On the other hand, in the third embodiment, a compression correction value identified by the error range compression circuit 45 and saved in the error range compression buffer 53 is added to error data prior to compression for compensating for the data lost when irreversibly compressing error data.

The diffusion matrix 230 is a filter that defines the weighting coefficients used for passing on (or adding) error data of peripheral pixels to the target pixel. The symbol "⊚" in the diffusion matrix 230 denotes the matrix element corresponding to the target pixel, while all elements of the diffusion matrix 230 with weighting coefficients are treated as peripheral pixels of the target pixel.

The error range compression buffer 53 is configured to store one byte worth of data. The error range compression buffer 53 saves a compression correction value that the error range compression circuit 45 identifies before compressing error data for a target pixel. The error range compression circuit 45 uses the compression correction value saved in the error range compression buffer 53 to correct error data for another pixel processed later as the target pixel.

Prior to compressing error data for a target pixel that is outputted from the subtractor 39, the error range compression circuit 45 adds the compression correction value saved in the error range compression buffer 53 to the error data for the current target pixel to correct this error data (see FIG. 10). The compression correction value added at this time is a value that was saved in the error range compression buffer 53 when processing the target pixel just prior to the current target pixel.

Next, before compressing the error data for the current target pixel and after the compression correction value was added, the error range compression circuit 45 identifies the data that will be lost through compression and saves this value in the error range compression buffer 53 as the next compression correction value use for a next target pixel (see FIG. 10).

Once the new compression correction value has been saved, the error range compression circuit 45 then irreversibly compresses the error data with the added compression correction value and outputs the compressed error data for the current target pixel. Specifically, the error range compression circuit 45 shifts the error data for the current target pixel that has been corrected by the compression correction value, to the right 3 bits, thereby compressing the data from a length of 11 bits to a length of 8 bits. In other words, the compressed error data outputted by the error range compression circuit 45 is a value obtained by dividing the error data corrected by the compression correction value by "8" (see FIG. 10). The error buffer 47 stores the compressed error data outputted by the error range compression circuit 45.

As described above, the error range compression circuit 45 identifies data that will be lost when compressing the error data and stores this data in the error range compression buffer 53 as the compression correction value. The error diffusion circuit 217 later passes this data on to a subsequent target pixel to compensate for the data lost during compression.

A bit string 260 shown in FIG. 10 illustrates an example of error data calculated by the subtractor 39. The first bit in the bit string 260 is a sign bit 262 indicating whether the error data is positive or negative. The remaining 10 bits of the bit string 260 (i.e., the bits excluding the sign bit 262) represent the absolute value of the error data.

Before compressing the error data for the target pixel, i.e., the bit string 260, the error diffusion circuit 217 corrects this error data by adding a bit string 264 representing the compression correction value passed on from another pixel processed earlier, as shown in FIG. 10. The bit string 264 representing the compression correction value in FIG. 10 is one byte worth of data having a sign bit 265 as the first bit.

Next, the error range compression circuit 45 finds data that will be lost through compression prior to irreversibly compressing a bit string 266 representing the error data of the target pixel after the compression correction value has been added. The error range compression circuit 45 saves the data that will be lost in the error range compression buffer 53 as the bit string 267 representing one byte worth of a compression correction value, as shown in FIG. 10.

Specifically, the error range compression circuit 45 finds a value corresponding to the round-off error that will be generated in subsequent processes to compress and decompress the error data for the target pixel with the added compression correction value (i.e., the bit string 266) and saves this value as a new compression correction value. As indicated in FIG. 10, the error diffusion circuit 217 according to the third embodiment compresses the error data from 11 bits to 8 bits by shifting the data 3 bits to the right and discarding the lowermost 3 bits of data. The error range compression circuit 45 saves this compressed data in the error buffer 47. Hence, only a bit string 268 representing the high-order 8 bits of error data is stored in the error buffer 47 as the compressed error data. The discarded lowermost 3 bits of data correspond to the bit string 267.

Further, the error data that has been compressed and stored in the error buffer 47 is later read, decompressed, and passed on to another pixel. As shown in FIG. 10, the error range decompression circuit 49 in the error diffusion circuit 217 according to the third embodiment restores the 8-bit compressed data to an 11-bit bit string 270 by shifting the compressed error data read from the error buffer 47 (the bit string 268) 3 bits to the left and adding a "0" to each bit in a bit string 271 representing the low-order 3 bits in the bit string 270 after the shift. When the error data is compressed and decompressed in this way, the low-order 3 bits of the error data is lost when the data is compressed. In other words, a round-off error in the range of −7 to 7 is produced in the error data for each pixel.

Thus, before compressing error data in the third embodiment, the error diffusion circuit 217 finds a value corresponding to the data that will be lost during compression, i.e., the round-off error that will be produced when the error data is compressed and decompressed, as the compression correction value (the bit string 267) and saves this value in the error range compression buffer 53. More specifically, as shown in FIG. 10, the error diffusion circuit 217 stores the low-order 3 bits of the bit string 266 to the low-order 3 bits of the one-byte bit string 267 and stores a sign equivalent to the sign bit 262 of the bit string 266 in the sign bit 265 of the bit string 267. The bit string 266 represents the error data for the target pixel with an added compression correction value (the bit string 264) and the one-byte bit string 267 represents the compression correction value. The error diffusion circuit 217 then saves this bit string 267 in the error range compression buffer 53 as the compression correction value.

The error diffusion circuit 217 subsequently reads this compression correction value (the bit string 267) from the error range compression buffer 53 when processing error data for the next target pixel and uses this value to correct the error data for that pixel.

Accordingly, although the low-order 3 bits of data is lost from the error data as round-off error when the data is compressed and decompressed, the error diffusion circuit 217 can pass on data of an amount equivalent to the round-off error. As described earlier with reference to FIGS. 1A-1D, error data for the target pixel having a value of "7", for example, becomes "0" when the error data is shifted right by 3 bits during compression, without adding a compression correction value. Hence, the restored error data shifted left by 3 bits will also be "0". Thus, all error data within the range of the round-off error (−7 to 7 in the preferred embodiment) is reset to "0" and cannot be accumulated when the noise value is not added.

However, the error diffusion circuit 217 according to the third embodiment adds a noise value to the error data prior to compression. Therefore, even when the absolute value of the error data is "7" or less, the absolute value is sometimes increased to "8" or greater when adding a noise value. That is, in some cases a "1" is carried to the high-order 8 bits by adding the noise value to the absolute value of the noise data, as in the bit string 266 in the example of FIG. 10. As a result, the absolute value of the error data after compression is "1" or greater, as in the bit string 268 in the example of FIG. 10, resulting in an absolute value of "8" or greater after the error data is decompressed, as in the bit string 270 in the example of FIG. 10. Thus, the error diffusion circuit 217 according to the third embodiment can prevent compression and decompression from always changing the error data to "0", even when the error data prior to compression is not "0".

Further, the error diffusion circuit 217 according to the third embodiment saves a value equivalent to the round-off error as the compression correction value and adds this saved value to the error data for a subsequently processed target pixel. Hence, the error diffusion circuit 217 can suitably compensate for the data lost when irreversibly compressing error data.

FIGS. 11A through 11D are explanatory diagrams illustrating how error data is passed on to other pixels through the thresholding process performed by the error diffusion circuit 217. Since the diffusion matrix 230 of the third embodiment has a vertical size of 2 pixels, as described with reference to FIG. 9, the error buffer 47 has been designed to store error data for two rasters worth of pixels, as shown in FIGS. 11A through 11D. The error data and compression correction values are given in decimal notation in FIGS. 11A through 11D.

In the following description, the threshold value that the comparison circuit 33 of FIG. 9 compares to the corrected pixel density I'xy will be "8", and output values of "1" and "0" are respectively converted to relative values of "1023" and "0" by the conversion circuit 35. To simplify the description, all output values and error data have been set to "0" for the first raster as a result of thresholding.

FIG. 11A conceptually illustrates the states of the error buffer 47 and error range compression buffer 53 after performing the thresholding process with the $k^{th}$ pixel $P_k$ in the second raster set as the target pixel. The error data calculated when thresholding the $k^{th}$ pixel $P_k$ is stored in a region $47_k$ of the error buffer 47 shown in FIG. 11A. In this example, the error data calculated when processing the $k^{th}$ pixel $P_k$ is "0", and the compression correction value is "0".

FIG. 11B conceptually illustrates the states of the error buffer 47 and error range compression buffer 53 after thresholding with the $(k+1)^{th}$ pixel $P_{k+1}$ set as the target pixel. The density of the $(k+1)^{th}$ pixel $P_{k+1}$ will be "7" in this example. Thus, the error diffusion circuit 217 corrects the density of "7" for the $(k+1)^{th}$ pixel $P_{k+1}$ based on the error data for peripheral pixels whose values are surrounded by a square border in the error buffer 47 shown in FIG. 11B. However, since the error data for both peripheral pixels is "0" in FIG. 11B, the corrected density of the $(k+1)^{th}$ pixel $P_{k+1}$ is still "7", the same value prior to correction.

Since this pixel density of "7" after correction is less than the threshold value "8", the error diffusion circuit 17 converts the density to an output value of "0". Next, the error diffusion circuit 17 subtracts the relative value "0" corresponding to the output value "0" from the corrected pixel density "7", resulting in a value of "7" as the error data for the $(k+1)^{th}$ pixel $P_{k+1}$. In the third embodiment, the compression correction value saved in the error range compression buffer 43 is added to the calculated error data for the $(k+1)^{th}$ pixel $P_{k+1}$. However, since the compression correction value currently saved in the error range compression buffer 43 is "0", the result of adding the compression correction value to the error data is still "7". When expressed as a bit string, the error data is $(+00000000111)_2$.

Next, the error diffusion circuit 217 compresses the error data for the target pixel by right-shifting the error data $(+00000000111)_2$ by 3 bits and stores the resulting compressed error data "0" in a region $47_{k+1}$ of the error buffer 47. In other words, the low-order 3 bits of the bit string representing the error data for the target pixel are lost during this compression. However, prior to compressing the error data, the error diffusion circuit 217 saves the data (+111)2 (i.e., the decimal value "7") that will be lost during compression in the error range compression buffer 53 as the compression correction value, overwriting the previously saved value.

FIG. 11C conceptually illustrates the states of the error buffer 47 and the error range compression buffer 53 after thresholding with the $(k+2)^{th}$ pixel $P_{k+2}$ set as the target pixel. In this example, the density of the $(k+2)^{th}$ pixel $P_{k+2}$ will be "7". The error diffusion circuit 217 corrects this pixel density "7" for the $(k+2)^{th}$ pixel $P_{k+2}$ based on error data for peripheral pixels whose values are surrounded by a square border in the error buffer 47 shown in FIG. 11C. However, since the error data for both peripheral pixels is "0" in FIG. 11C, the corrected density of the $(k+2)^{th}$ pixel $P_{k+2}$ remains unchanged at "7".

Since the corrected pixel density "7" for the target pixel is less than the threshold value "8", the error diffusion circuit 217 converts this density to the output value "0". Next, the error diffusion circuit 217 calculates the error data for the $(k+2)^{th}$ pixel $P_{k+2}$ as "7" by subtracting the relative value "0" corresponding to the output value "0" from the corrected pixel density "7". In the third embodiment, the compression correction value of "7" saved in the error range compression buffer 53 when processing the previous pixel is added to the error data for the current target pixel. The result of adding this compression correction value to the error data for the target pixel is "14", or $(+0000001110)_2$ when expressed as a bit string.

Next, the error diffusion circuit 217 compresses the corrected error data $(+0000001110)_2$ for the $(k+2)^{th}$ pixel $P_{k+2}$ by right-shifting the data 3 bits and stores the resulting compressed error data $(+0000001)_2$ in a region $47_{k+2}$ of the error buffer 47. Further, prior to compressing this error data, the error diffusion circuit 217 overwrites the compression correction value stored in the error range compression buffer 43 with the data that will be lost during compression, or $(+110)_2$ (i.e., "6" in decimal form) in this case.

FIG. 11D conceptually illustrates the states of the error buffer 47 and the error range compression buffer 53 after thresholding with the $(k+3)^{th}$ pixel $P_{k+3}$ set as the target pixel. In this example, the density of the $(k+3)^{th}$ pixel $P_{k+3}$ will be "7". Here, the error diffusion circuit 217 corrects the density of the $(k+3)^{th}$ pixel $P_{k+3}$ based on error data for peripheral pixels whose values are surrounded by a square border in FIG. 11D. Specifically, the error diffusion circuit 217 reads the error data "1" stored in the region $47_{k+2}$ and left-shifts this data 3 bits in order to restore the error data "8" for the peripheral pixel adjacent on the left side. Next, the error diffusion circuit 217 multiplies the error data "8" for this peripheral pixel by the corresponding weighting coefficient "½" defined in the diffusion matrix 230 to obtain the correction value $E_{ave}xy$ "4" and adds this correction value to the pixel data "7" for the $(k+3)^{th}$ pixel $P_{k+3}$. Hence, the corrected pixel density for the $(k+3)^{th}$ pixel $P_{k+3}$ is 7+4=11.

Since the corrected pixel density "11" for the target pixel is greater than the threshold value "8", the error diffusion circuit 217 converts this density to an output value of "1". Next, the error diffusion circuit 217 subtracts the relative value "1023" corresponding to the output value "1" from the corrected pixel density "11" to obtain the value "–1012" as the error data for the $(k+3)^{th}$ pixel $P_{k+3}$. Since the error diffusion circuit 217 of the third embodiment adds the compression correction value "6" that was saved in the error range compression buffer 53 when processing the previous pixel to the error data for the current target pixel, the resulting error data after adding the compression correction value is "–1006".

Next, the error diffusion circuit 217 compresses the error data $(-1111101110)_2$ for the target pixel by right-shifting the data 3 bits and stores the resulting compressed error data "–125" in a region $47_{k+3}$ of the error buffer 47. Further, prior to compressing this error data, the error diffusion circuit 217 overwrites the existing compression correction value in the error range compression buffer 53 with the data that will be lost when compressing the error data for the current target pixel as the new compression correction value. In this case, the data that will be lost is $(-110)_2$, or "–6" in decimal form.

As described above, the error diffusion circuit 217 of the printer 1 according to the third embodiment uses a compression correction value equivalent to the data lost when compressing error data for the target pixel to correct error data for the next target pixel, thereby using the compression correction value to compensate for data lost through irreversible compression. In other words, even when the error data becomes "0" because of data lost through irreversible compression, this error can be passed on to another pixel through the compression correction value. As a result, even though some error data is lost through irreversible compression, pixels with an output value of "1" can still be produced, as in the pixel $P_{k+3}$ shown in FIG. 11D, allowing the printer 1 to still form dots and thereby suppress toner jump at lower densities.

If error data comprising 11 bits, for example, were saved in the error buffer 47 without being compressed, a large enough error buffer 47 would have to be allocated to hold 16 bits of data per pixel. Accordingly, the error buffer 47 would require a capacity of (the vertical size of the diffusion matrix)×(the number of pixels in one raster)×(16 bits). However, since the error diffusion circuit 217 in the printer 1 according to the third embodiment can compress the error data for each pixel to 8 bits, the capacity of the error buffer 47 need only be (the vertical size of the diffusion matrix 230)×(the number of pixels in one raster)×(8 bits). However, since the printer 1 of the third embodiment also requires 8 bits for the error range compression buffer 43, the required memory capacity can be reduced by [(the vertical size of the diffusion matrix 230)× (the number of pixels in one raster)×(8 bits)+(8 bits)].

Further, since the printer 1 according to the third embodiment compensates for error data that will be lost through irreversible compression by adding a compression correction value to error data for the next target pixel, error data can be properly distributed throughout the overall image.

The printer 1 according to the third embodiment also identifies the data that will be lost to compression after a compression correction value, that was saved when processing the previous target pixel, has been added to the error data for the current target pixel, and saves the data that will be lost as a compression correction value. Hence, data lost during the process of irreversibly compressing error data for each pixel is passed on (i.e., added to) error data for the next target pixel. In other words, the printer 1 can properly pass on error data without discarding data lost during compression.

The printer 1 according to the third embodiment adds the compression correction value, which is saved when processing an $n^{th}$ target pixel, to error data for an $(n+1)^{th}$ target pixel, thereby compensating for data lost from error data through irreversible compression in the error data for a neighboring pixel.

Figure 12:
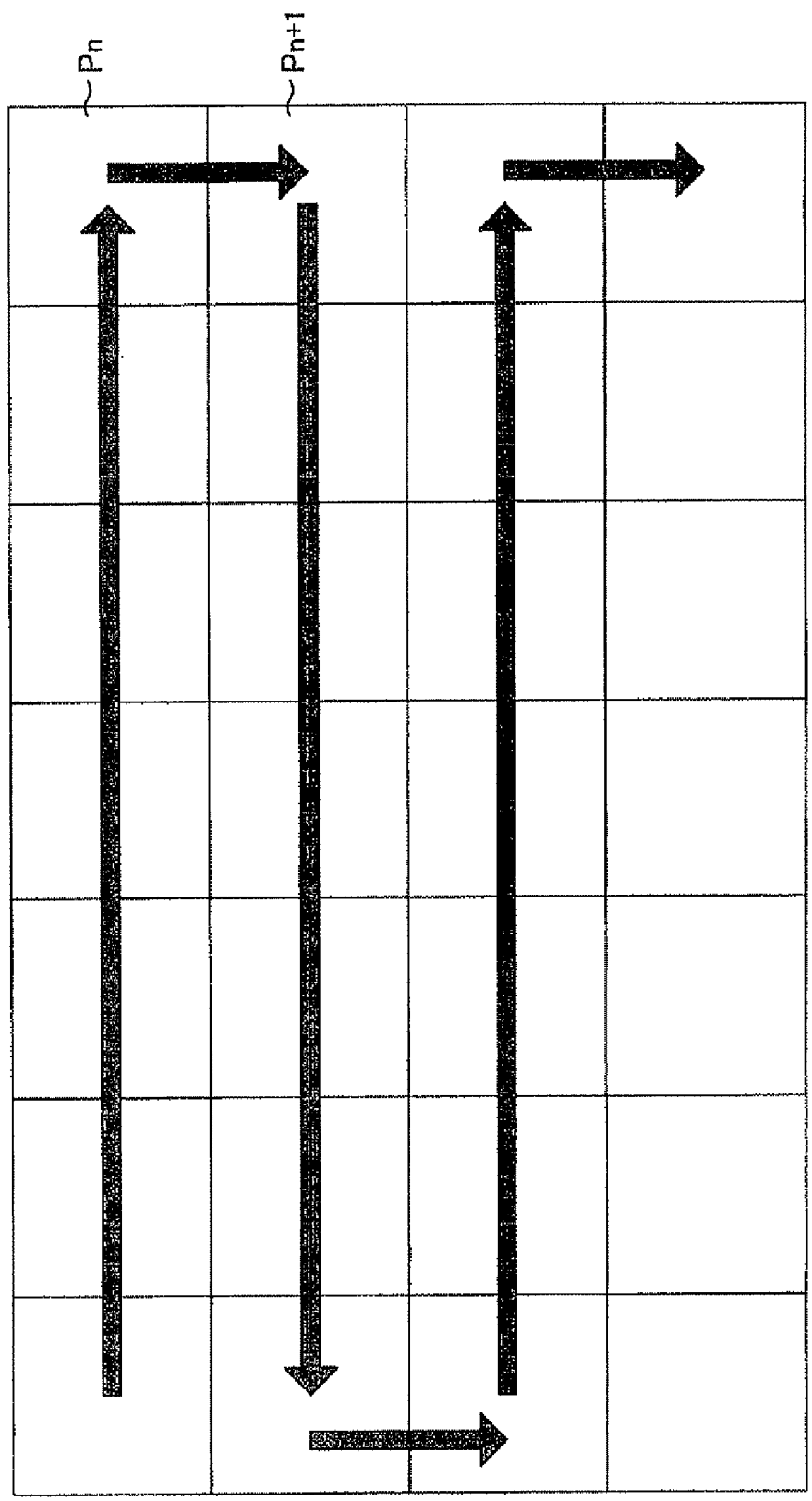
FIG. 12 illustrate an order in which the error diffusion circuit processes pixels in a halftone image according to the third embodiment.

Arrows in the explanatory diagram of FIG. 12 illustrate the order in which the error diffusion circuit 217 processes a halftone image. As illustrated in FIG. 12, the error diffusion circuit 217 according to the third embodiment processes pixels in one raster constituting the halftone image in a sequence from the left end to the right end of the one raster. After processing the pixel on the right end, the error diffusion circuit 217 processes pixels in the next raster directly below the first raster in a sequence from the right end to the left end. Thus, the error diffusion circuit 217 alternates the direction in which pixels for each raster are processed.

For example, when the pixel $P_n$ processed as the $n^{th}$ target pixel is positioned on the right end of the raster, as shown in FIG. 12, the error diffusion circuit 217 adds the compression correction value, which is saved when processing this pixel $P_n$, to error data for a pixel $P_{n+1}$ processed as the $(n+1)^{th}$ target pixel, where the pixel $P_{n+1}$ is positioned on the right end of the next raster. By processing a halftone image bidirectionally in this way, the error diffusion circuit 217 can compensate for data lost through irreversible compression in error data for an adjacent pixel, even when the data is lost from error data for a pixel on the end of a raster. Put another way, a compression correction value produced by a pixel at the end of a raster is not directly added to error data for a pixel on the opposite end of the next raster. Hence, error generated in one pixel does not greatly influence error data for a pixel greatly separated from the one pixel. As a result, the densities of all pixels can be converted to output values capable of more accurately reflecting the overall density of the halftone image.

While the invention has been described in detail with reference to specific embodiments thereof, it would be apparent to those skilled in the art that many modifications and variations may be made therein without departing from the spirit of the invention, the scope of which is defined by the attached claims.

For example, the printer 1 according to the above embodiments described above performs a thresholding process to convert the density of each pixel in the halftone image to either an output value indicating "dot output" or an output value indicating "no dot output." However, the first embodiment may be applied to methods of quantizing pixel data to three or more values. For example, the first embodiment may be applied to a method of converting pixel densities to one of the four output values "large dot output," "medium dot output," "small dot output," and "no dot output."

Further, while the above embodiments were described for a monochrome printer, the present invention may also be applied to a color printer that forms images using colorant in a plurality of colors. In this case, pixel densities for a plurality of colors, such as cyan, magenta, yellow, and black, are defined for each pixel in the halftone image. Accordingly, in the above embodiments, the comparison circuit 33 of the error diffusion circuit 17, 117, or 217 processes the pixel density for each color of the pixel. Further, the subtractor 39 calculates and outputs error data for each color of the target pixel.

In the first embodiment, after the subtractor 39 outputs error data, the noise adder 41 adds a different noise value for each color to the error data calculated for each color. Through this process, it is easy to produce dots in a plurality of colors at random positions, so that dots in the plurality of colors appear at dispersed positions rather than becoming concentrated at the same position, thereby suppressing a drop in image quality.

In the second embodiment, after the subtractor 39 outputs error data, the error range decompression circuit 49 adds a different noise value for each color to the error data for each peripheral pixel calculated for each color. By adding different noise values for each color in this way, the occurrence rate for dots of each color is less likely to be regular, thereby suppressing a drop in image quality.

In the third embodiment, after the subtractor 39 outputs error data, the error range compression circuit 45 saves a compression correction value in the error range compression buffer 43 for each color identified in the error data calculated for the respective color. Further, the error range compression circuit 45 can add these compression correction values to the error data for each color in the next target pixel. Through this process, error data for each color of a target pixel can be properly passed on to each color of another pixel.

Further, the above embodiments are not limited to the method of compressing error data to an 8-bit string. Similar effects to those described in the above embodiments can be obtained when compressing error data to a bit number equivalent to a multiple of 8.

While a random number is added to the error data as a noise value in the above embodiments, the noise value added to the error data may be the remainder produced when dividing the density of the target pixel by a prescribed value capable of generating remainder within the range of the round-off error produced by compression and decompression (for example, "8" when a 3-bit round-off error is produced). Alternatively, the added noise value may be the remainder obtained when dividing the average value of the density of the target pixel and the densities of neighboring pixels by the prescribed value. However, it is preferable that the noise values vary from pixel to pixel.

Further, in the third embodiment described above, the error range compression buffer 43 saves only a compression correction value for one pixel. That is, the compression correction value found when processing the $n^{th}$ target pixel is only added to error data for the $(n+1)^{th}$ target pixel. However, the error range compression buffer 43 may be configured to save compression correction values for a plurality of pixels, whereby the error range compression circuit 45 would add the compression correction values for these plurality of pixels to the error data of the target pixel after multiplying compression correction values for pixels closer to the target pixel by a larger weighting coefficient.

What is claimed is:

1. An image processor for processing each pixel of a halftone image by sequentially setting each pixel as a target pixel, each pixel being defined by a pixel density representing a gradation level of each pixel, the image processor comprising:
    a converting unit that converts the pixel density of the target pixel into a first output value, the first output value indicating whether or not a dot is formed on the target pixel;
    an error data calculation unit that calculates error data of the target pixel, the error data corresponding to a difference between the first output value and the pixel density;
    a compression unit that irreversibly compresses the error data of the target pixel, partial data of the pixel density being lost from the error data when irreversibly compressing the error data;
    an error buffer that stores the compressed error data of the target pixel and a plurality of sets of compressed error data for a plurality of processed pixels, the plurality of processed pixels having been processed by the converting unit, the error data calculation unit, and the compression unit prior to the target pixel;
    a decompression unit that reads a plurality of sets of compressed error data for a plurality of peripheral pixels with respect to a next target pixel from the error buffer and decompresses the compressed error data sets for the plurality of peripheral pixels, the next target pixel being processed next to the target pixel;
    a density correction unit that corrects a pixel density of the next target pixel based on the decompressed error data sets for the plurality of peripheral pixels, the converting unit converting the corrected pixel density of the next target pixel into a second output value, the second output value indicating whether or not a dot is formed on the next target pixel; and
    a data compensating unit that compensates the partial data.

2. The image processor according to claim 1, wherein the data compensating unit adds a noise value to the error data of the target pixel on a pixel basis before the compression unit compresses the error data, and
    wherein the compression unit compresses the error data including the noise value.

3. The image processor according to claim 2, wherein a plurality of sets of color halftone images makes up a color image, each color halftone image being configured from a plurality of pixels, each pixel being defined by a pixel density of a corresponding color,
    wherein the converting unit converts the pixel density for each color of the target pixel into an output value, the output value indicating whether or not a dot for the corresponding color is formed on the target pixel,
    wherein the error data calculation unit calculates error data for each color of the target pixel, the error data for each color corresponding to a difference between the output value for each color and the pixel density for each color, and wherein the data compensating unit adds the noise value to the error data for each color of the target pixel on a color basis.

4. The image processor according to claim 2, wherein the compression unit outputs a first value as the compressed error data of the target pixel, the first value being obtained by dividing the error data of the target pixel that includes the noise value, by a predetermined value, wherein the decompression unit outputs a second value as the decompressed error data set for each of the plurality of peripheral pixels, each of the second value obtained by multiplying the compressed error data set for each of the plurality of peripheral pixels by the predetermined value, wherein a range of noise values is equivalent to a range of round-off error that is produced when the compression unit compresses the error data and the decompression unit decompresses the plurality of compressed error data sets.

5. The image processor according to claim 4, wherein the noise value is a random number within the range of round-off error.

6. The image processor according to claim 1, wherein the data compensating unit adds a noise value to the decompressed error data set for each of the plurality of peripheral pixels on a pixel basis after the decompression unit decompresses the compressed error data sets for the plurality of peripheral pixels, wherein the density correction unit corrects the pixel density of the next target pixel based on the decompressed error data sets each including the noise value.

7. The image processor according to claim 6, wherein a plurality of sets of color halftone images makes up a color image, each color halftone image being configured from a plurality of pixels, each pixel being defined by a pixel density of a corresponding color, wherein the data compensating unit adds the noise value to the decompressed error data set of each color for each of the plurality of peripheral pixels on a color basis.

8. The image processor according to claim 6, wherein the compression unit outputs a first value as the compressed error data of the target pixel, the first value being obtained by dividing the error data of the target pixel by a predetermined value, wherein the decompression unit outputs a second value as the plurality of decompressed error data set for each of the plurality of peripheral pixels, each of the second value obtained by multiplying the compressed error data set for each of the plurality of peripheral pixels by the predetermined value, wherein a range of noise values is equivalent to a range of round-off error that is produced when the compression unit compresses the error data and the decompression unit decompresses the plurality of the compressed error data sets.

9. The image processor according to claim 8, wherein the noise value is a random number within the range of round-off error.

10. The image processor according to claim 1, further comprising a correction value calculation unit that calculates data, as a correction value, lost when irreversibly compressing the error data of the target pixel by the compression unit before the compression unit compresses the error data of the target pixel, and a storage unit that stores the calculated data as the correction value, and wherein the data compensating unit corrects error data of another target pixel based on the correction value of the target pixel stored in the storage unit before the compression unit compresses the error data of the another target pixel, the another target pixel being processed after the target pixel, and wherein the compression unit compresses the error data of the another target pixel that includes the correction value of the target pixel.

11. The image processor according to claim 10, wherein the data compensating unit adds the correction value of the target pixel to the error data of the another target pixel to correct the error data of the another target pixel.

12. The image processor according to claim 11, wherein the correction value calculation unit that calculates another data, as another correction value, lost when irreversibly compressing the error data including the correction value, of the another target pixel by the compression unit, and wherein the storage unit stores the another correction value.

13. The image processor according to claim 12, wherein the compression unit outputs a first value as the compressed error data of the target pixel, the first value being obtained by dividing the error data of the target pixel that includes the correction value, by a predetermined value, wherein the decompression unit outputs a second value as the decompressed error data set for each of the plurality of peripheral pixels, each of the second value obtained by multiplying the compressed error data set for each of the plurality of peripheral pixels by the predetermined value, wherein the another correction value corresponds to a round-off error that is produced when the compression unit compresses the error data including the correction value and the decompression unit decompresses the compressed error data sets.

14. The image processor according to claim 10, wherein the halftone image includes a plurality of pixel rows each having a plurality of pixels, the plurality of pixels of each pixel row having one pixel positioned at one end of each pixel row and another pixel positioned at another end of each pixel row, wherein the converting unit processes the plurality of pixels in one pixel row of the plurality of pixel rows in a sequence from one pixel to another pixel, and processes the plurality of pixel in another pixel row of the plurality of pixel rows in a sequence from another pixel to one pixel, another pixel row being next to one pixel row in the plurality of pixel rows, and wherein the data correction unit adds the correction value of the target pixel stored in the storage unit to error data of the next target pixel.

15. An image processor for processing each pixel of a halftone image by sequentially setting each pixel as a target pixel, each pixel being defined by a pixel density representing a gradation level of each pixel, the image processor comprising:

a converting unit that converts the pixel density of the target pixel into an output value, the output value indicating whether or not a dot is formed on the target pixel;

an error data calculation unit that calculates error data of the target pixel, the error data corresponding to a difference between the output value and the pixel density;

a compression unit that irreversibly compresses the error data of the target pixel, partial data of the pixel density being lost from the error data when irreversibly compressing the error data;

an error buffer that stores the compressed error data of the target pixel;

a decompression unit that reads and decompresses the compressed error data of the target pixel that is stored in the error buffer; and a data compensating unit that compensates the partial data.

16. The image processor according to claim 15, wherein the data compensating unit adds a noise value to the error data of the target pixel on a pixel basis before the compression unit compresses the error data, and wherein the compression unit compresses the error data including the noise value.

17. The image processor according to claim 15, wherein the data compensating unit adds a noise value to the decompressed error data of the target pixel on a pixel basis after the decompression unit decompresses the compressed error data of the target pixel.

18. The image processor according to claim 15, further comprising a correction value calculation unit that calculates data, as a correction value, lost when irreversibly compressing the error data of the target pixel by the compression unit before the compression unit compresses the error data of the target pixel, and a storage unit that stores the calculated data as the correction value, and wherein the data compensating unit corrects error data of another target pixel based on the correction value of the target pixel stored in the storage unit before the compression unit compresses the error data of the another target pixel, the another target pixel being processed after the target pixel, and wherein the compression unit compresses the error data of the another target pixel that includes the correction value of the target pixel.

* * * * *